US011897275B2

(12) United States Patent
Washizawa

(10) Patent No.: US 11,897,275 B2
(45) Date of Patent: Feb. 13, 2024

(54) PRINTING APPARATUS

(71) Applicant: SEIKO EPSON CORPORATION, Tokyo (JP)

(72) Inventor: Takehito Washizawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/184,885

(22) Filed: Feb. 25, 2021

(65) Prior Publication Data

US 2021/0268816 A1 Sep. 2, 2021

(30) Foreign Application Priority Data

Feb. 28, 2020 (JP) ................................ 2020-033138

(51) Int. Cl.
*B41J 29/02* (2006.01)
*B41J 2/165* (2006.01)
*B41J 29/13* (2006.01)

(52) U.S. Cl.
CPC ........... *B41J 29/02* (2013.01); *B41J 2/16532* (2013.01); *B41J 29/13* (2013.01); *B41P 2235/27* (2013.01)

(58) Field of Classification Search
None
See application file for complete search history.

(56) References Cited

U.S. PATENT DOCUMENTS

| | | | | |
|---|---|---|---|---|
| 6,523,822 | B1 * | 2/2003 | Galtier | B65H 1/06 271/171 |
| 7,918,452 | B2 * | 4/2011 | Fuchi | B65H 7/02 271/240 |
| 8,408,829 | B2 * | 4/2013 | Kawaguchi | B41J 11/0065 400/352 |
| 8,955,945 | B2 * | 2/2015 | Miwa | B41J 2/16505 347/30 |
| 9,487,025 | B2 | 11/2016 | Kitagishi | |
| 9,573,374 | B2 | 2/2017 | Wakabayashi | |
| 9,662,907 | B2 | 5/2017 | Kitagishi | |
| 9,956,796 | B2 | 5/2018 | Kitagishi | |

(Continued)

FOREIGN PATENT DOCUMENTS

| | | |
|---|---|---|
| JP | 2002-249260 A | 9/2002 |
| JP | 2014-168881 A | 9/2014 |

(Continued)

*Primary Examiner* — Alejandro Valencia
(74) *Attorney, Agent, or Firm* — WORKMAN NYDEGGER

(57) ABSTRACT

A printing apparatus includes a carriage supporting a liquid discharging head for discharging liquid onto a medium being transported, and caused to perform scanning along a width direction intersecting with a transport direction of the medium, a supporting member having a first guide rail extending along the width direction, and a support face capable of supporting the medium, a first engaging portion engaged with the first guide rail, and an edge holder having a plate member covering a first end portion of the medium on a first direction side in the width direction. On the first direction side of an end portion on the first direction side in the width direction of the first guide rail, a retraction region is provided in which the edge holder can be disposed in a state in which an engaging state between the first guide rail and the first engaging portion is released.

10 Claims, 12 Drawing Sheets

(56) References Cited

U.S. PATENT DOCUMENTS

| | | | | |
|---|---|---|---|---|
| 2003/0178764 | A1* | 9/2003 | Hasegawa ................ | B65H 1/04 271/171 |
| 2014/0247304 | A1 | 9/2014 | Wakabayashi | |
| 2016/0089904 | A1 | 3/2016 | Kitagishi | |
| 2017/0021642 | A1 | 1/2017 | Kitagishi | |
| 2017/0225495 | A1 | 8/2017 | Kitagishi | |
| 2018/0178554 | A1 | 6/2018 | Washizawa | |
| 2019/0193435 | A1 | 6/2019 | Washizawa et al. | |

FOREIGN PATENT DOCUMENTS

| | | |
|---|---|---|
| JP | 2016-068420 A | 5/2016 |
| JP | 2018-103366 | 7/2018 |
| JP | 2019-111702 | 7/2019 |

* cited by examiner

PRINTING APPARATUS

The present application is based on, and claims priority from JP Application Serial Number 2020-033138, filed Feb. 28, 2020, the disclosure of which is hereby incorporated by reference herein in its entirety.

BACKGROUND

1. Technical Field

The present disclosure relates to a printing apparatus including a carriage that is caused to perform scanning along a width direction that intersects with a transport direction of a medium, a supporting member having a support face capable of supporting the medium, and an edge holder having a plate member covering an end portion in the width direction of the medium.

2. Related Art

JP 2018-103366 A discloses a printing apparatus including a carriage that supports a liquid discharging head for discharging liquid onto a medium being transported, and is caused to perform scanning along a width direction that intersects with a transport direction of the medium, and a platen, as an example of a supporting member that has a support face capable of supporting the medium. The printing apparatus includes a first edge holder having a plate member covering one end portion in the width direction of the medium, and a second edge holder having a plate member covering another end portion in the width direction of the medium. The first edge holder and the second edge holder are each a medium holding member that holds down the end portion in the width direction of the medium toward the platen.

Incidentally, when a medium jam occurs in the printing apparatus described above, there is a possibility that the carriage presses the edge holder via a jam portion of the medium to load on the edge holder, and thus the edge holder is damaged.

SUMMARY

A printing apparatus for solving the above-described problems includes a carriage configured to support a liquid discharging head for discharging liquid onto a medium being transported, and to be caused to perform scanning along a width direction intersecting with a transport direction of the medium, a supporting member having a first guide rail extending along the width direction, and a support face capable of supporting the medium, and an edge holder having a first engaging portion engaged with the first guide rail, and a plate member covering a first end portion of the medium on a first direction side in the width direction, wherein on the first direction side of an end portion on the first direction side in the width direction of the first guide rail, a retraction region is provided in which the edge holder can be disposed in a state in which an engaging state between the first guide rail and the first engaging portion is released.

DESCRIPTION OF EXEMPLARY EMBODIMENTS

An exemplary embodiment of a printing apparatus will be described below with reference to the accompanying drawings.

Figure 1:
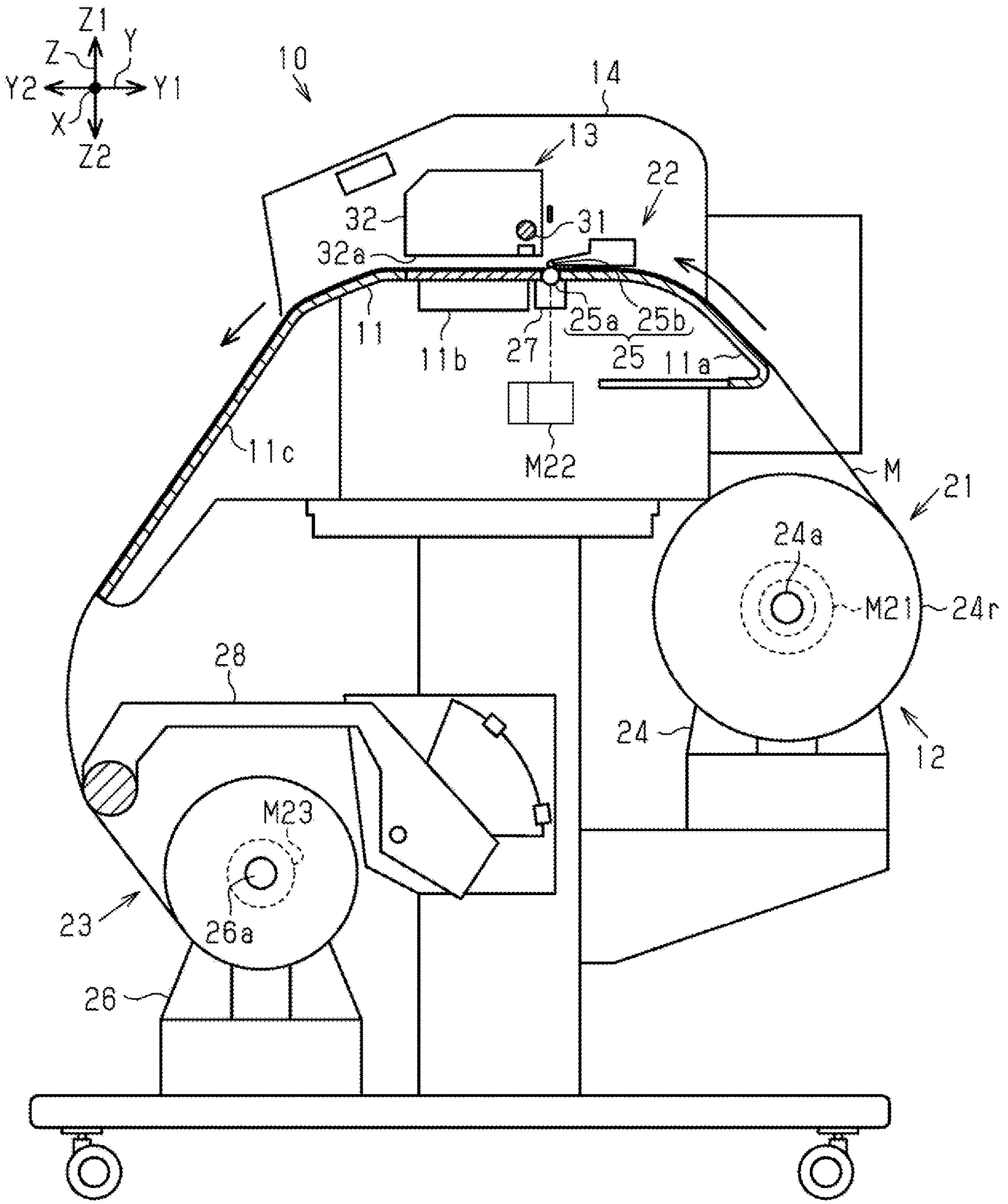
FIG. 1 is a cross-sectional view schematically illustrating a printing apparatus according to an exemplary embodiment.

A printing apparatus 10 illustrated in FIG. 1 is, for example, a large format printer for printing on an elongated medium M having a large size. In addition, the printing apparatus 10 is a serial type ink jet printer as well. The printing apparatus 10 includes a medium support portion 11 supporting the medium M, a transport device 12 transporting the medium M in a direction indicated by an arrow in FIG. 1, a printing unit 13 printing on the medium M, and a housing 14 accommodating a part of the medium support portion 11, a part of the transport device 12, and the printing unit 13.

In the following description, a short direction of the medium M is referred to as a width direction X, and a direction in which the medium M is transported at a position where the printing unit 13 performs printing is referred to as a transport direction Y. The transport direction Y is also a longitudinal direction of the medium M. In the present exemplary embodiment, the width direction X and the transport direction Y are directions intersecting with (for example, orthogonal to) each other, the both are directions intersecting with (for example, orthogonal) a vertical direction Z. In addition, for end portions in the short direction of the medium M, an end portion located on a first direction side X1 in the width direction X is referred to as a first end portion M1, and an end portion located on a second direction side X2 in the width direction X is referred to as a second end portion M2.

As illustrated in FIG. 1, the medium support portion 11 has a first support portion 11*a*, a second support portion 11*b*, and a third support portion 11*c* that form a transport path of the medium M. The first support portion 11*a* supports the medium M before printing by the printing unit 13 is performed. The second support portion 11*b* supports the medium M on which printing is performed by the printing unit 13. As described below, the second support portion 11*b* has a supporting member 70 supporting the medium M, and a first edge holder 78 and a second edge holder 79 attached to the supporting member 70. The third support portion 11*c* supports the medium M after printing is performed by the printing unit 13. Note that, the first to third support portions 11*a* to 11*c* are heated by a heater (not illustrated) to facilitate preheating of the medium M before and during printing, and drying of ink on the medium M after printing.

The transport device 12 includes a feeding unit 21 feeding the medium M, a transport unit 22 transporting the fed medium M in the transport direction Y, and a winding unit 23 winding the medium M transported on an upper surface of the third support portion 11*c* after printing in a roll shape.

The feeding unit 21 has a first holding portion 24 including a support shaft 24*a* rotatably supporting a roll body 24*r* around which the medium M is wound in a roll shape, and a feeding motor M21 serving as a power supply for the feeding unit 21. When the feeding motor M21 is driven and the support shaft 24*a* rotates, the elongated medium M is fed from the roll body 24*r*.

The transport unit 22 has a roller pair 25 that sandwiches (nips) the medium M fed from the feeding unit 21 and transports in the transport direction Y, and a transport motor M22 serving as a power source of the transport unit 22. The roller pair 25 is disposed on an upstream side Y1 of a liquid discharging head 37 described below in the transport direction Y. The roller pair 25 has a driving roller 25*a* supported by a frame 27, and a driven roller 25*b* rotating in association with rotation of the driving roller 25*a*. When the transport motor M22 is driven and the driving roller 25*a* is rotated, the roller pair 25 sandwiches and transports the medium M.

Further, the winding unit 23 has a second holding portion 26 including a winding shaft 26*a*, and a winding motor M23 serving as a power source of the winding unit 23. A portion in the medium M between the third support portion 11*c* and the winding unit 23 after printing is pressed by a tensioning portion 28, and thus tension is applied to the medium M. The winding motor M23 is driven and the winding shaft 26*a* is rotated, and thus the winding shaft 26*a* is wound with the medium M to which the tension is applied by the tensioning portion 28.

Figure 2:
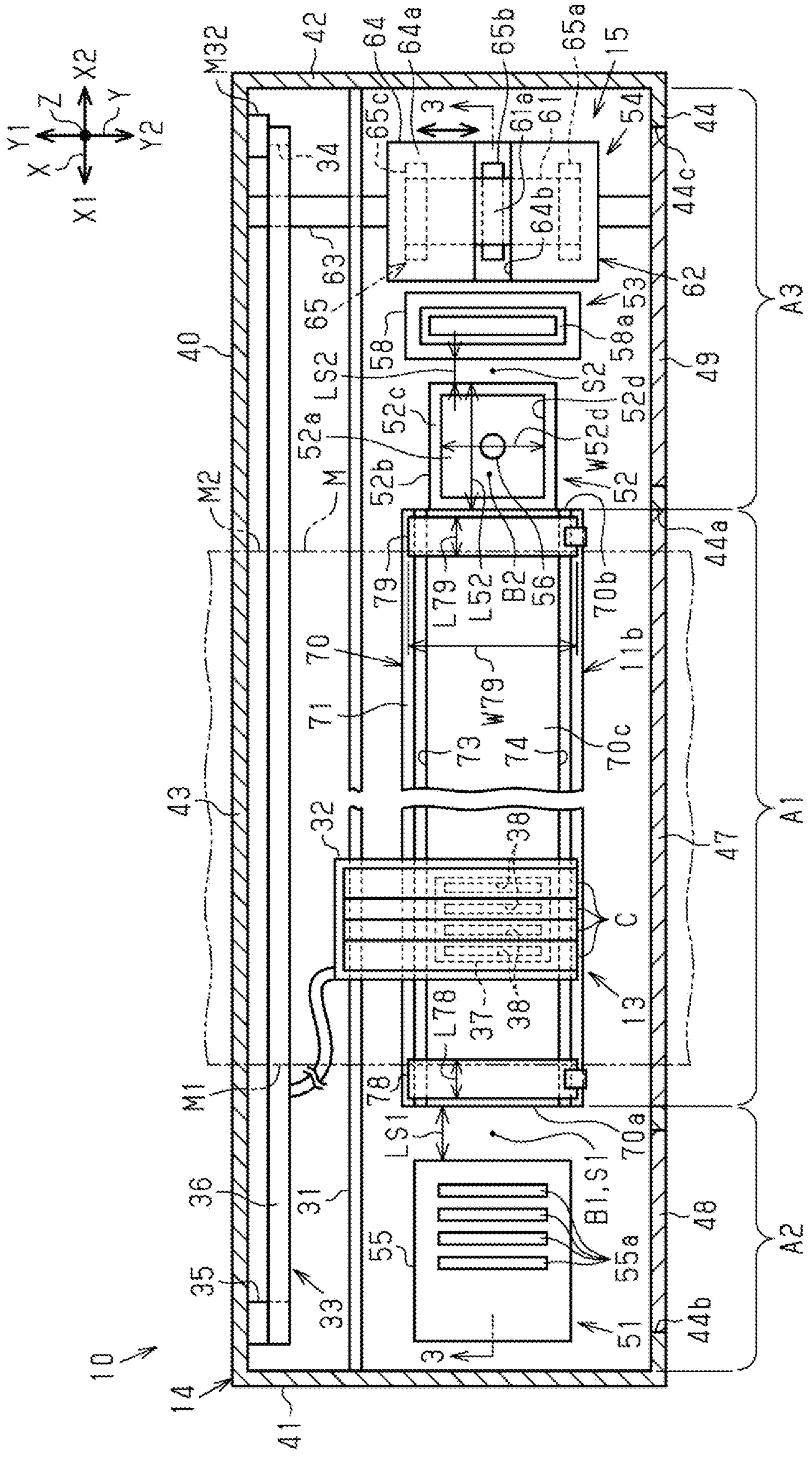
FIG. 2 is a cross-sectional view schematically illustrating the printing apparatus.

As illustrated in FIG. 2, the printing unit 13 has a guide shaft 31, a carriage 32 supported by the guide shaft 31, and a scanning mechanism 33 that causes the carriage 32 to perform scanning along an axial direction of the guide shaft 31. The guide shaft 31 is provided such that the axial direction is along the width direction X. Thus, the carriage 32 is caused to perform scanning along the width direction X.

The scanning mechanism 33 has a driving pulley 34 and a driven pulley 35 supported in a rotatable manner on an inner surface of the housing 14. An output shaft of a carriage motor M32 serving as a power source when the carriage 32 is caused to perform scanning, is joined to the driving pulley 34. Also, an endless timing belt 36, a part of which is joined to the carriage 32, is hooked between a pair of the pulleys 34 and 35. Then, the carriage 32 reciprocates along the width direction X while being guided by the guide shaft 31, by the timing belt 36 alternately orbiting and moving in one direction and an opposite direction thereto by driving force of the carriage motor M32.

Figure 3:
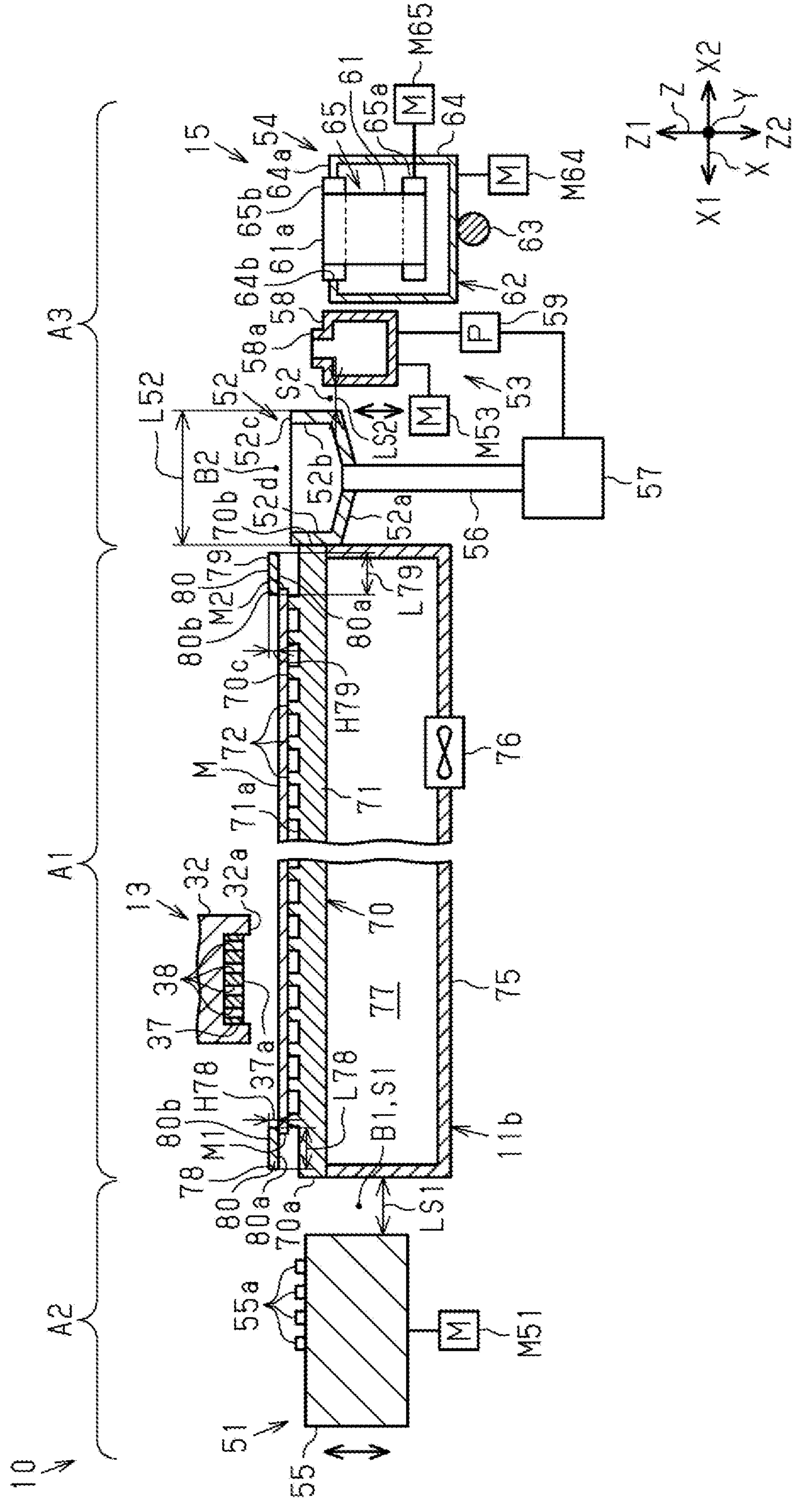
FIG. 3 is a cross-sectional view taken along a line 3-3 in FIG. 2.

As illustrated in FIG. 3, the carriage 32 supports the liquid discharging head 37 that discharges liquid toward the medium M supported by the second support portion 11*b*. The liquid discharging head 37 has a nozzle 38 from which liquid is discharged. The liquid discharging head 37 of the present exemplary embodiment has four nozzles 38 aligned in the width direction X. Each nozzle 38 is open to a lower side Z2 in the vertical direction Z. A surface of the liquid discharging head 37 where the nozzle 38 opens is referred to as a nozzle opening surface 37*a*. In the present exemplary embodiment, the nozzle opening surface 37*a* is provided at a position recessed with respect to a lower surface 32*a* of the carriage 32. In other words, the lower surface 32*a* of the carriage 32 protrudes toward the lower side Z2 with respect to the nozzle opening surface 37*a*.

As illustrated in FIG. 2, a plurality of liquid containing bodies C containing ink, which is an example of liquid supplied to the liquid discharging head 37, are detachably attached to the carriage 32. The liquid containing bodies C of the present exemplary embodiment contain cyan, magenta, yellow, and black inks, respectively.

Liquid supplied from each liquid containing body C to the liquid discharging head 37 is discharged from the nozzle 38 toward the medium M, to perform printing on the medium M. Note that, when liquid is discharged from the nozzle 38 toward the medium M, a part of the liquid discharged toward the medium M may be atomized, become a mist, and float between the nozzle opening surface 37*a* of the liquid discharging head 37 and the medium M. Such a mist may be caused to flow by an airflow generated by reciprocating movement of the carriage 32, discharge of liquid, or the like, and may adhere to the nozzle opening surface 37*a*.

The printing apparatus 10 is capable of performing a transport operation in which the transport motor M22 is driven for a predetermined period of time to transport the medium M, and a printing operation in which the liquid discharging head 37 is caused to inject liquid onto the medium M supported by the second support portion 11*b*, while the carriage motor M32 is driven to reciprocate the carriage 32. The printing apparatus 10 performs printing on an entirety of the medium M, by alternately performing the transport operation and the printing operation.

Note that, a scanning range of the carriage 32 in the width direction X when the printing apparatus 10 performs the printing operation is determined according to, for example, a dimension in the short direction of the medium M, a print range on the medium M set by a user, and the like. Suppose that the user sets a print range PA in the short direction of the medium M. Of both ends of the print range PA in the width direction X, an end located on the first direction side X1 is referred to as a first end PA1, and an end located on the second direction side X2 is referred to as a second end PA2.

In this case, the carriage 32 is caused to perform scanning such that, among the four nozzles 38, the nozzle 38 located farthest on the second direction side X2 in the width direction X is movable to at least the first end PA1, and the nozzle 38 located farthest on the first direction side X1 in the width direction X is movable to at least the second end PA2. When the nozzle 38 located farthest on the second direction side X2 in the width direction X moves to the first end PA1 of the medium M, a part of the carriage 32 may protrude from the supporting member 70 described below to the first direction side X1. Further, when the nozzle 38 located farthest on the first direction side X1 in the width direction X moves to the second end PA2 of the medium M, a part of the carriage 32 may protrude from the supporting member 70 to the second direction side X2.

Figure 4:
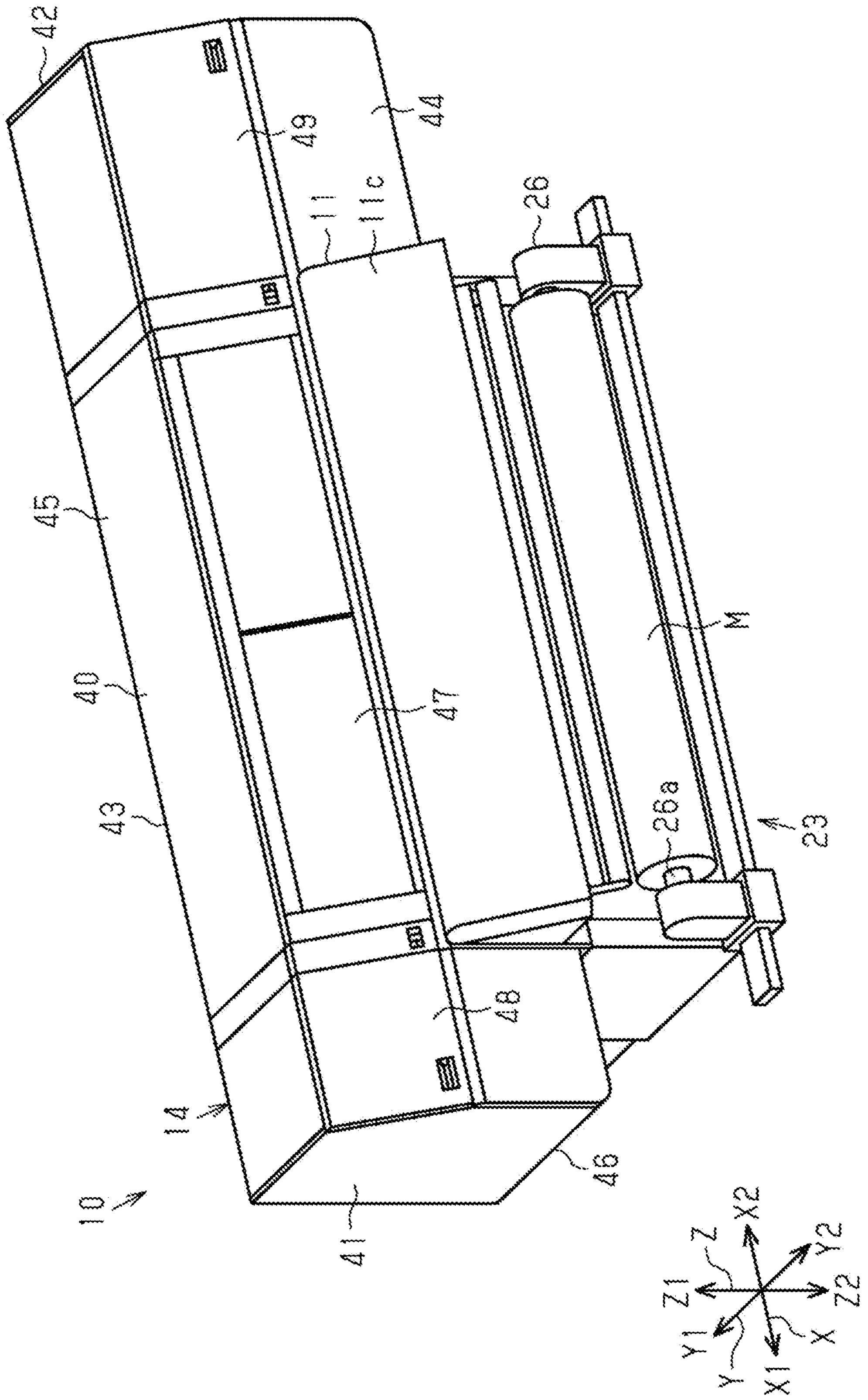
FIG. 4 is a perspective view schematically illustrating a housing.

As illustrated in FIG. 4, the housing 14 has a main body portion 40, and first to third covers 47 to 49. The main body portion 40 has a box shape constituted by first to sixth wall portions 41 to 46. The first wall portion 41 and the second wall portion 42 are wall portions facing each other in the width direction X. The guide shaft 31 described above is bridged between the first wall portion 41 and the second wall portion 42. The third wall portion 43 and the fourth wall portion 44 are wall portions facing each other in the transport direction Y. The fourth wall portion 44 is located on a downstream side Y2 of the third wall portion 43 in the transport direction Y. The driving pulley 34 and the driven pulley 35 described above are supported by an inner surface of the third wall portion 43. The fifth wall portion 45 and the sixth wall portion 46 are wall portions facing each other in the vertical direction Z. As illustrated in FIGS. 1 and 2, the main body portion 40 accommodates the second support portion 11*b*, the transport unit 22, and the printing unit 13.

As illustrated in FIG. 2, the second support portion 11*b* is disposed in the housing 14 near a center in the width direction X. For regions in the housing 14 along the width direction X, a region in which the second support portion 11*b* is disposed is referred to as a first region A1, a region located farther on the first direction side X1 in the width direction X of the second support portion 11*b* is referred to as a second region A2, and a region located on the second direction side X2 in the width direction X of the second support portion 11*b* is referred to as a third region A3. The first region A1 is located between the second region A2 and the third region A3 in the width direction X.

The fourth wall portion 44 has first to third openings 44*a* to 44*c*. The first opening 44*a* is provided at a position corresponding to the first region A1 in the width direction X. The second opening 44*b* is provided at a position corresponding to the second region A2 in the width direction X. The third opening 44*c* is provided at a position corresponding to the third region A3 in the width direction X.

The first cover 47 is attached to the main body portion 40 so as to be able to open and close the first opening 44*a*. In a state in which the first cover 47 closes the first opening 44*a*, the first cover 47 covers the first opening 44*a* from outside the main body portion 40. In a state in which the first cover 47 opens the first opening 44*a*, the user can access the first region A1 from the first opening 44*a*.

The second cover 48 is attached to the main body portion 40 so as to be able to open and close the second opening 44*b*. In a state in which the second cover 48 closes the second opening 44*b*, the second cover 48 covers the second opening 44*b* from outside the main body portion 40. In a state in which the second cover 48 opens the second opening 44*b*, the user can access the second region A2 from the second opening 44*b*.

The third cover 49 is attached to the main body portion 40 so as to be able to open and close the third opening 44*c*. In a state in which the third 49 closes the third opening 44*c*, the third cover 49 covers the third opening 44*c* from outside the main body portion 40. In a state in which the third cover 49 opens the third opening 44*c*, the user can access the third region A3 from the third opening 44*c*.

Next, the second support portion will be described in detail.

Figure 5:
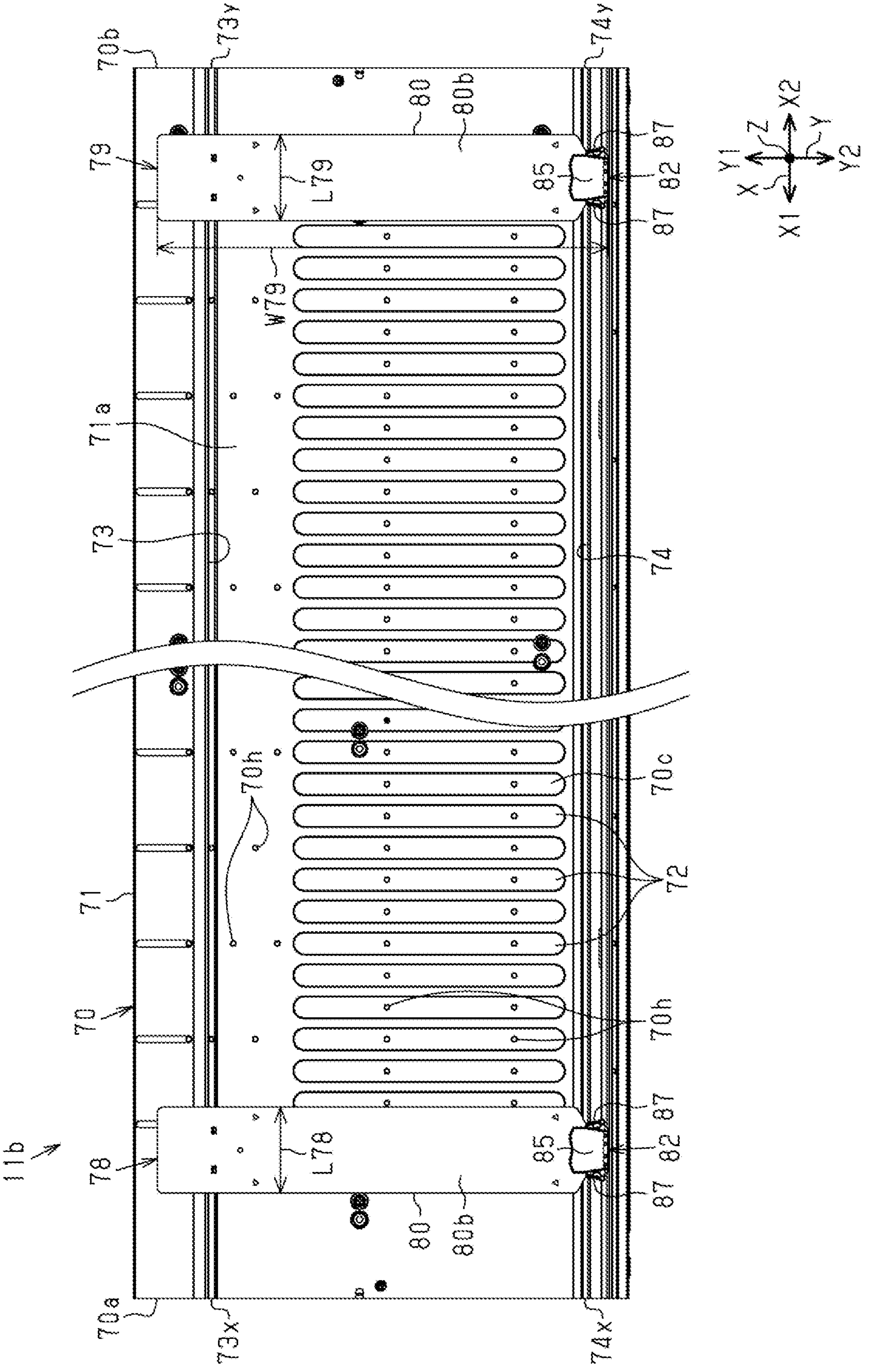
FIG. 5 is a plan view of a supporting member.

As illustrated in FIGS. 3 and 5, the second support portion 11*b* has a plate supporting member 70. The supporting member 70 is a flat platen. The supporting member 70 has a rectangular platen main body 71, a plurality of ribs 72 protruding from the platen main body 71, and a plurality of suction holes 70*h* penetrating the supporting member 70 in a plate thickness direction. Note that, in FIG. 2, the rib 72 and the suction hole 70*h* are not illustrated.

A longitudinal direction of the platen main body 71 is the width direction X, and a short direction of the platen main body 71 is the transport direction Y. An upper surface of the platen main body 71 is a base surface 71*a* from which the plurality of ribs 72 protrude. An end surface located on the first direction side X1 in the width direction X in the platen main body 71 is referred to as a first side surface 70*a* of the supporting member 70, and an end surface located on the second direction side X2 in the width direction X in the platen main body 71 is referred to as a second side surface 70*b* of the supporting member 70.

The plurality of ribs 72 are aligned in the longitudinal direction of the platen main body 71. When the supporting member 70 is viewed from the plate thickness direction, each rib 72 has a track shape. A longitudinal direction of each rib 72 is the short direction of the platen main body 71, and a short direction of each rib 72 is the longitudinal direction of the platen main body 71. A tip surface of each rib 72 located at a tip of the rib 72 in a protruding direction from the base surface 71*a* is a surface that supports the medium M. In other words, the supporting member 70 has a support face 70*c* capable of supporting the medium M on the tip surface of each rib 72.

The plurality of suction holes 70*h* are disposed in a plurality of rows in each of the longitudinal direction and the short direction of the platen main body 71. In the present exemplary embodiment, some of the plurality of suction holes 70*h* are open in the support face 70*c*.

The supporting member 70 has a first guide rail 73 and a second guide rail 74 extending along the longitudinal direction of the platen main body 71. That is, the supporting member 70 has the first guide rail 73 and the second guide rail 74 that extend along the width direction X. The first guide rail 73 and the second guide rail 74 have first end portions 73*x* and 74*x* as end portions located on the first direction side X1 in the width direction X, and second end portions 73*y* and 74*y* as end portions located on the second direction side X2 in the width direction X, respectively.

Each of the first guide rail 73 and the second guide rail 74 of the present exemplary embodiment is provided across an entirety of the supporting member 70 in the width direction X. In other words, each of the first guide rail 73 and the second guide rail 74 is continuous with the first side surface 70*a* of the supporting member 70, and continuous with the second side surface 70*b* of the supporting member 70. Thus, the respective first end portions 73*x* and 74*x* of the guide rails 73 and 74 open at the first side surface 70*a* of the supporting member 70, and the respective second end portions 73*y* and 74*y* of the guide rails 73 and 74 open at the second side surface 70*b* of the supporting member 70.

The second guide rail 74 is provided at a position different from that of the first guide rail 73 in the transport direction Y. Specifically, the first guide rail 73 and the second guide rail 74 are provided so as to sandwich the ribs 72 in the transport direction Y. The first guide rail 73 is located on the upstream side Y1 of the ribs 72 in the transport direction Y, and the second guide rail 74 is located on the downstream side Y2 of the ribs 72 in the transport direction Y.

Figure 7:
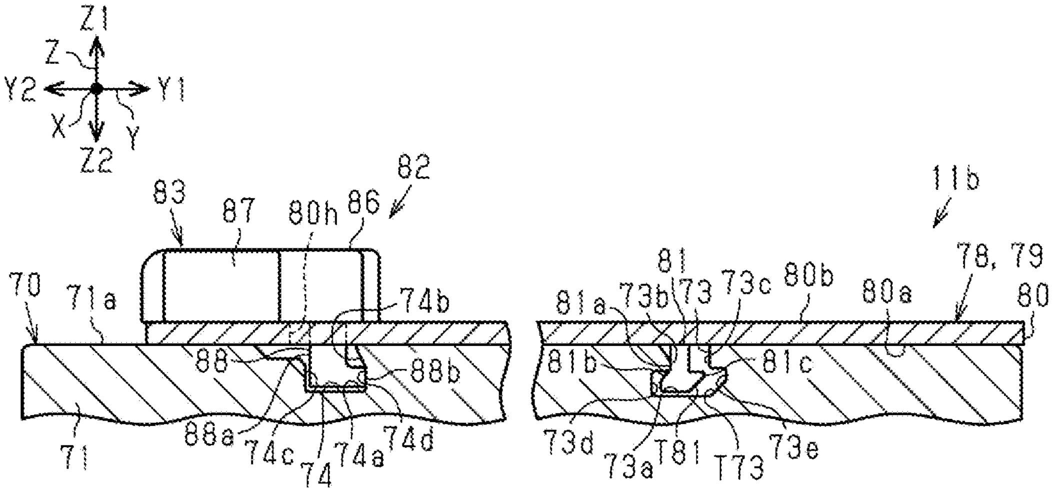
FIG. 7 is a cross-sectional view of the edge holder in the slide-regulated state.

As illustrated in FIG. 7, the first guide rail 73 and the second guide rail 74 of the present exemplary embodiment each have a concave shape recessed from the base surface 71*a* of the platen main body 71. The first guide rail 73 has a first bottom surface 73*a*, a first inner side surface 73*b* that joins the first bottom surface 73*a* to the base surface 71*a*, and a second inner side surface 73*c* that joins the first bottom surface 73*a* to the base surface 71*a*, and faces the first inner side surface 73*b* in the transport direction Y. The first inner side surface 73*b* is a surface that is closer to the second guide rail 74 in the transport direction Y, and the second inner side surface 73*c* is a surface that is farther from the second guide rail 74 in the transport direction Y. In other words, the first inner side surface 73*b* is a surface located on the downstream side Y2 in the transport direction Y, and the second inner side surface 73*c* is a surface located on the upstream side Y1 in the transport direction Y. Additionally, the first guide rail 73 has a first recessed portion 73*d* recessed from the first inner side surface 73*b* to the downstream side Y2 in the transport direction Y, and a second recessed portion 73*e* recessed from the second inner side surface 73*c* to the upstream side Y1 in the transport direction Y. The first guide rail 73 forms a reverse T shape in a side view viewed in the width direction X. The second recessed portion 73*e* has a guide side tapered surface T73 that inclines toward an upper side Z1 in the vertical direction Z as the guide side tapered surface T73 extends toward the upstream side Y1 in the transport direction Y.

The second guide rail 74 has a second bottom surface 74*a*, a third inner side surface 74*b* that joins the second bottom surface 74*a* to the base surface 71*a*, and a fourth inner side surface 74*c* that joins the second bottom surface 74*a* to the base surface 71*a*, and faces the third inner side surface 74*b* in the transport direction Y. The third inner side surface 74*b* is a surface that is closer to the first guide rail 73 in the transport direction Y, and the fourth inner side surface 74*c* is a surface that is farther from the first guide rail 73 in the transport direction Y. In other words, the third inner side surface 74*b* is a surface located on the upstream side Y1 in the transport direction Y, and the fourth inner side surface 74*c* is a surface located on the downstream side Y2 in the transport direction Y. Additionally, the second guide rail 74 has a third recessed portion 74*d* that is recessed from the third inner side surface 74*b* to the upstream side Y1 in the transport direction Y.

As illustrated in FIG. 3, the second support portion 11*b* has a suction chamber forming member 75 provided below the supporting member 70 in the vertical direction Z, and an exhaust fan 76 provided at the suction chamber forming member 75. The suction chamber forming member 75 has a box shape that opens to the upper side Z1 in the vertical direction Z, and is coupled to a lower surface of the platen main body 71. A suction chamber 77 is formed by the lower surface of the platen main body 71, and an inner surface of the suction chamber forming member 75. The suction chamber 77 communicates with an outside of the suction chamber 77 through the suction hole 70*h* of the supporting member 70. When the exhaust fan 76 is driven and air in an inside of the suction chamber 77 is discharged, a pressure of the inside of the suction chamber 77 becomes negative. Thus, the medium M is supported with suction by the support face 70*c* via the suction hole 70*h*.

As illustrated in FIGS. 2 and 5, the first edge holder 78 and the second edge holder 79 are detachably attached to the supporting member 70. The first edge holder 78 and the second edge holder 79 are aligned in the width direction X. The second edge holder 79 is located on the second direction side X2 of the first edge holder 78 in the width direction X.

The first edge holder 78 and the second edge holder 79 each have a rectangular plate member 80. The first edge holder 78 and the second edge holder 79 are each disposed on the supporting member 70 such that a longitudinal direction of the plate member 80 is the short direction of the platen main body 71, and a short direction of the plate member 80 is the longitudinal direction of the platen main body 71. Thus, the longitudinal direction of the plate member 80 is the transport direction Y, and the short direction of the plate member 80 is the width direction X.

As illustrated in FIG. 2, a position of each of the edge holders 78 and 79 in the width direction X is set according to a dimension in the short direction of the medium M. The position of the first edge holder 78 in the width direction X is adjusted such that a part in the short direction of the plate member 80 covers the first end portion M1 of the medium M. The position of the second edge holder 79 in the width direction X is adjusted such that a part in the short direction of the plate member 80 covers the second end portion M2 of the medium M. The first end portion M1 of the medium M is pressed by the first edge holder 78, and the second end portion M2 of the medium M is pressed by the second edge holder 79, thus floating of the medium M from the supporting member 70 is suppressed.

Figure 6:
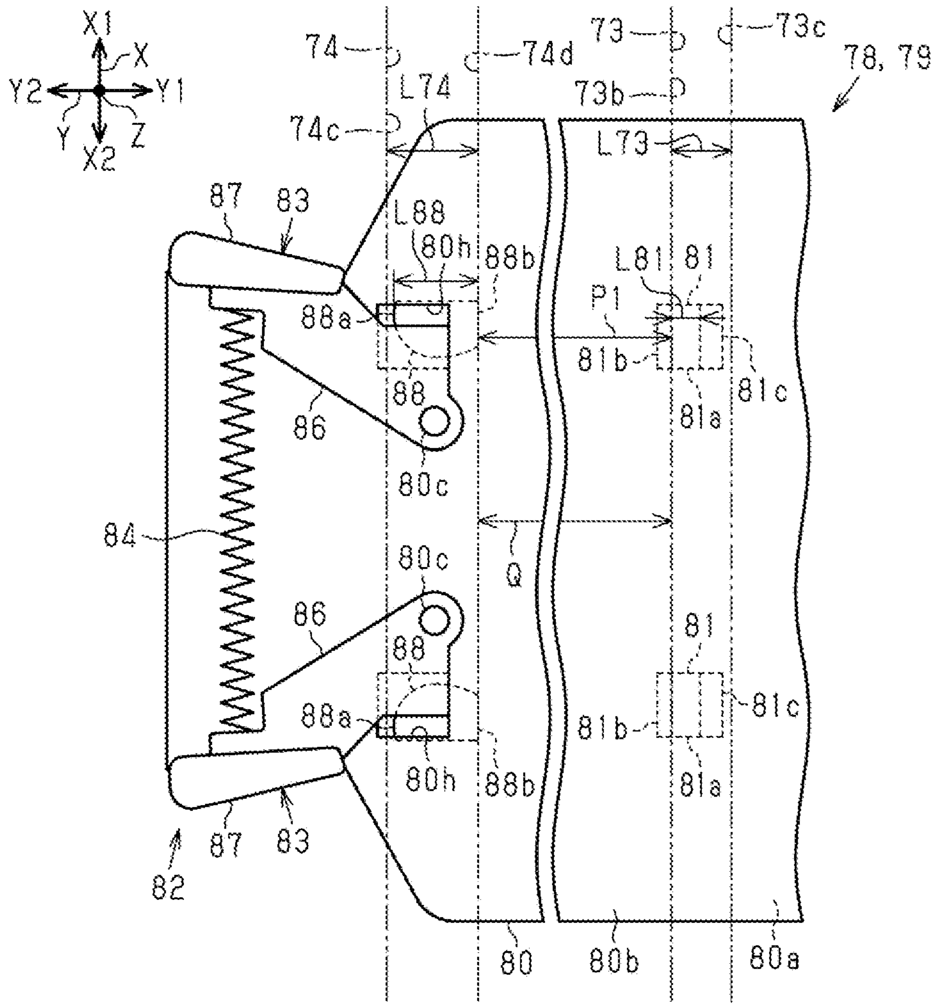
FIG. 6 is a plan view of an edge holder in a slide-regulated state.

As illustrated in FIGS. 6 and 7, the plate member 80 has a first surface 80*a* that is a surface facing the supporting member 70, and a second surface 80*b* that is a surface on an opposite side to the first surface 80*a*. The first surface 80*a* is a lower surface of the plate member 80, and the second surface 80*b* is an upper surface of the plate member 80. A pair of cylindrical rotational movement shafts 80*c* protrude from the second surface 80*b* of the plate member 80. The pair of rotational movement shafts 80*c* are aligned in a short direction of the plate member 80, that is, in the width direction X, at an end portion of the plate member 80 located on the downstream side Y2 in the transport direction Y. In addition, a pair of rectangular insertion holes 80*h* that penetrate the plate member 80 in a plate thickness direction are formed at the end portion of the plate member 80 located on the downstream side Y2 in the transport direction Y. The pair of insertion holes 80*h* are also aligned in the short direction of the plate member 80, that is, in the width direction X. The pair of insertion holes 80*h* are disposed so as to sandwich the pair of rotational movement shafts 80*c* in the width direction X.

As illustrated in FIG. 7, the first edge holder 78 and the second edge holder 79 each have a pair of first engaging portions 81 protruding from the first surface 80*a* of the plate member 80. As illustrated in FIG. 6, the pair of first engaging portions 81 are aligned in the short direction of the plate member 80, that is, in the width direction X, at an end portion of the plate member 80 located on the upstream side Y1 in the transport direction Y. Each of the first engaging portions 81 has a first base portion 81*a*, a first protruding piece 81*b* protruding from the first base portion 81*a* to the downstream side Y2 in the transport direction Y, and a second protruding piece 81*c* protruding from the first base portion 81*a* to the upstream side Y1 in the transport direction Y. The first engaging portion 81 forms a reverse T shape in a side view viewed in the width direction X. The second protruding piece 81*c* has a projection side tapered surface T81 that inclines so as to approach the plate member 80 as the projection side tapered surface T81 extends toward the upstream side Y1 in the transport direction Y.

As illustrated in FIGS. 6 and 7, the first edge holder 78 and the second edge holder 79 each have an operating portion 82. The operating portion 82 has a pair of rotating portions 83, a biasing member 84 (see FIG. 6), and a cover portion 85 (see FIG. 5). Note that, in FIGS. 6 and 7, the cover portion 85 is not illustrated, in order to detail structure of the rotating portion 83.

As illustrated in FIG. 6, the pair of rotating portions 83 are aligned in the width direction X. Each rotating portion 83 includes an arm portion 86, a gripping portion 87, and a second engaging portion 88. The arm portion 86 is disposed on a side of the second surface 80*b* of the plate member 80. One end portion of the arm portion 86 is rotatably attached to the rotational movement shaft 80*c* of the plate member 80. The gripping portion 87 is provided at an end portion of the arm portion 86 on an opposite side to the end portion attached to the rotational movement shaft 80*c*. The gripping portion 87 is provided on the downstream side Y2 of the rotational movement shaft 80*c* in the transport direction Y.

As illustrated in FIG. 7, the second engaging portion 88 protrudes from a lower surface of the arm portion 86. The second engaging portion 88 has a second base portion 88*a* protruding to a side of the first surface 80*a* of the plate member 80, and a third protruding piece 88*b* protruding from the second base portion 88*a*, by being inserted through the insertion hole 80*h* of the plate member 80. The second engaging portion 88 forms an L shape in a side view viewed in the width direction X. A gap is provided between an outer circumferential surface of the second base portion 88*a* and an inner circumferential surface that partitions the insertion hole 80*h*. Thus, the second base portion 88*a* is movable within the insertion hole 80*h* along with rotation of the arm portion 86 about the rotational movement shaft 80*c*.

As illustrated in FIG. 6, the biasing member 84 of the present exemplary embodiment is a coil spring. The biasing member 84 couples the arm portions 86 to each other in the width direction X, between the gripping portion 87 of one rotating portion 83 and the gripping portion 87 of another rotating portion 83. The cover portion 85 covers the rotational movement shaft 80*c*, the pair of arm portions 86, and the biasing member 84, from the side of the second surface 80*b* of the plate member 80. Note that the pair of gripping portions 87 are not covered by the cover portion 85.

As illustrated in FIG. 7, the edge holders 78 and 79 are attached to the supporting member 70 by the first engaging portion 81 engaged with the first guide rail 73, and the second engaging portion 88 engaged with the second guide rail 74. The first engaging portion 81 and the second engaging portion 88 each have a convex shape that protrudes from the plate member 80 toward the supporting member 70. With the first engaging portion 81 engaged with the first guide rail 73, the first protruding piece 81*b* faces the first recessed portion 73*d*, and the second protruding piece 81*c* faces the second recessed portion 73*e*. Additionally, with the second engaging portion 88 engaged with the second guide rail 74, the third protruding piece 88*b* is located within the third recessed portion 74*d*. Thus, the second engaging portion 88 is restricted from falling out of the second guide rail 74.

As illustrated in FIG. 6, a dimension L81 of the first engaging portion 81 in the transport direction Y is set to be a dimension smaller than a dimension L73 of the first guide rail 73 in the transport direction Y. Here, the dimension L81 of the first engaging portion 81 refers to a dimension of the first base portion 81*a* in the transport direction Y. Additionally, the dimension L73 of the first guide rail 73 refers to a distance from the first inner side surface 73*b* to the second inner side surface 73*c* in the transport direction Y.

A dimension L88 of the second engaging portion 88 in the transport direction Y is set to be a dimension slightly smaller than a dimension L74 of the second guide rail 74 in the transport direction Y. Here, the dimension L88 of the second engaging portion 88 refers to a distance from an end surface of the third protruding piece 88*b* located on the upstream side Y1 in the transport direction Y to the second base portion 88*a* located on the downstream side Y2 in the transport direction Y. Additionally, the dimension L74 of the second guide rail 74 refers to a distance from the fourth inner side surface 74*c* in the transport direction Y to a recessed portion bottom surface of the third recessed portion 74*d*.

When an absolute value of a difference between the dimension L81 of the first engaging portion 81 and the dimension L73 of the first guide rail 73 is ΔL1, and an absolute value of a difference between the dimensions L88 of the second engaging portion 88 and the dimension L74 of the second guide rail 74 is ΔL2, ΔL1 is greater than ΔL2. Thus, in a state in which the first engaging part 81 is engaged with the first guide rail 73, movement of the first engaging portion 81 within the first guide rail 73 in the transport direction Y is permitted. On the other hand, in a state in which the second engaging portion 88 is engaged with the second guide rail 74, movement of the second engaging portion 88 within the second guide rail 74 in the transport direction Y is substantially not permitted.

Note that, when the dimension L88 of the second engaging portion 88 is set to an identical dimension to the dimension L74 of the second guide rail 74, and ΔL2 is set to zero, movement of the second engaging portion 88 with respect to the second guide rail 74 in the width direction X is also not permitted. To permit the movement of the second engaging portion 88 with respect to the second guide rail 74 in the width direction X, it is necessary to set the dimension L88 of the second engaging portion 88 to be slightly smaller than the dimension L74 of the second guide rail 74, and set ΔL2 to be greater than zero.

Each of the first edge holder 78 and the second edge holder 79 can be brought into a slide-regulated state in which sliding in the width direction X with respect to the supporting member 70 is regulated, or a slide-enabled state in which sliding in the width direction X with respect to the supporting member 70 is permitted. The state of each of the edge holders 78 and 79 is changed by the user manipulating the operating portion 82. When the user pinches the pair of gripping portions 87 so as to be brought closer to each other with force greater than biasing force of the biasing member 84, the edge holders 78 and 79 are brought into the slide-enabled state, and when the user is not pinching the pair of gripping portions 87, the edge holders 78 and 79 are brought into the slide-regulated state.

In FIGS. 6 and 7, the edge holders 78 and 79 in the slide-regulated state are illustrated. At this time, since the user is not pinching the pair of gripping portions 87, the biasing member 84 biases the pair of rotating portions 83 such that the pair of arm portions 86 move away from each other in the width direction X. The second base portion 88*a* of the second engaging portion 88 is located on the upstream side Y1 in the transport direction Y within the insertion hole 80*h*. At this time, a shortest distance between the first base portion 81*a* of the first engaging portion 81 and the third protruding piece 88*b* of the second engaging portion 88 in the transport direction Y is defined as a first distance P1. Additionally, a shortest distance between the first inner side surface 73*b* of the first guide rail 73 and the recessed portion bottom surface of the third recessed portion 74*d* of the second guide rail 74 in the transport direction Y is referred to as an inter-rail distance Q. The first distance P1 is less than or equal to the inter-rail distance Q.

The third protruding piece 88*b* of the second engaging portion 88 biases the recessed portion bottom surface of the third recessed portion 74*d* toward the upstream side Y1 in the transport direction Y. The first base portion 81*a* of the first engaging portion 81 biases the first inner side surface 73*b* toward the downstream side Y2 in the transport direction Y. Additionally, the first protruding piece 81*b* is located within the first recessed portion 73*d*, and the second protruding piece 81*c* is located outside the second recessed portion 73*e*. In other words, the first engaging portion 81 is located on the downstream side Y2 in the transport direction Y within the second guide rail 74. The first protruding piece 81*b* is located within the first recessed portion 73*d*, thereby restricting the first engaging portion 81 from falling out of the first guide rail 73.

When the edge holders 78 and 79 are in the slide-regulated state, the first engaging portion 81 and the second engaging portion 88 sandwich a portion of the supporting member 70 between the first guide rail 73 and the second guide rail 74 in the transport direction Y. Thus, sliding in the width direction X of the edge holders 78 and 79 with respect to the supporting member 70 is regulated. In addition, pressing force that regulates the end portion of the medium M going to float by the plate member 80, and presses the end portion toward the supporting member 70 is generated in the edge holders 78 and 79.

Figure 8:
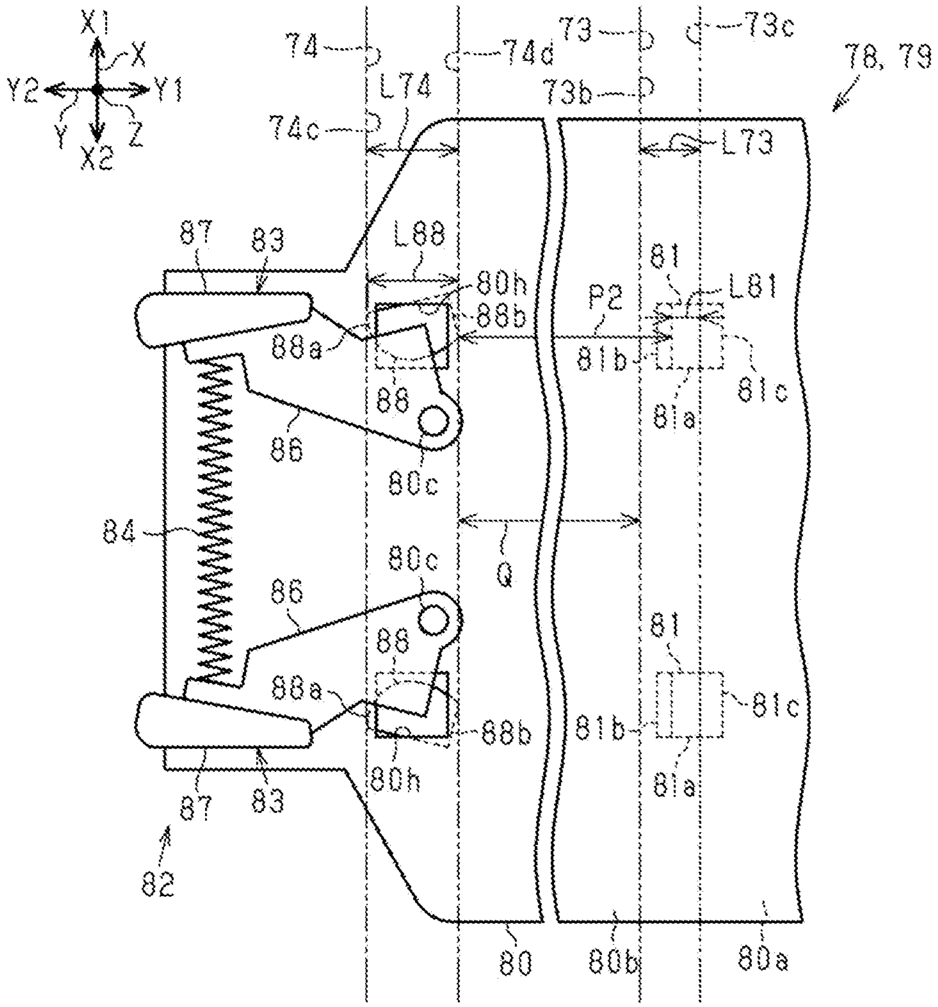
FIG. 8 is a plan view of the edge holder in a slide-enabled state.
Figure 9:
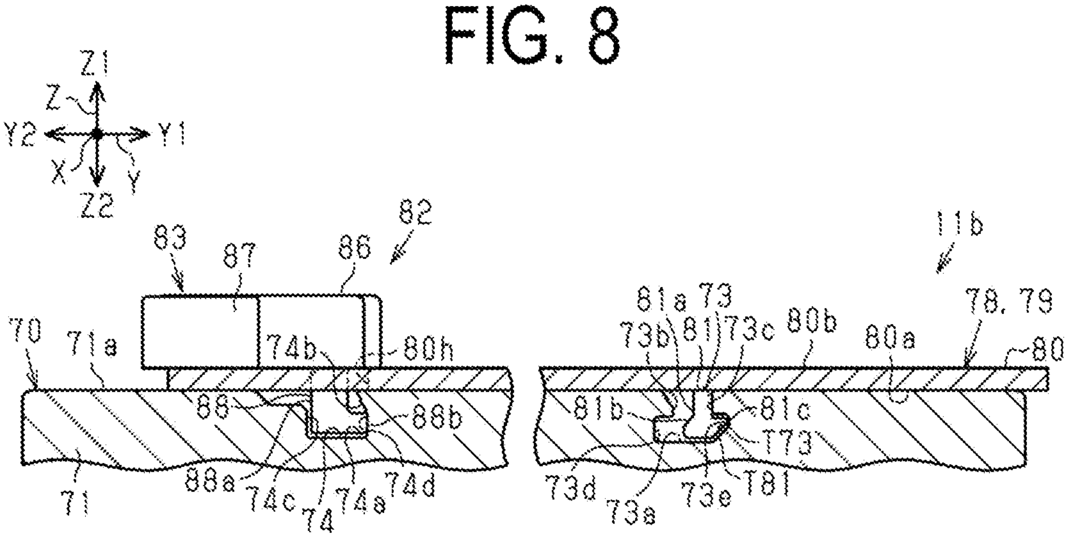
FIG. 9 is a cross-sectional view of the edge holder in the slide-enabled state.

In FIGS. 8 and 9, the edge holders 78 and 79 in the slide-enabled state are illustrated. When the user pinches the pair of gripping portions 87 so as to be brought closer to each other, the pair of rotating portions 83 rotate about the rotational movement shafts 80*c* respectively such that the pair of arm portions 86 are brought closer to each other. At this time, as described above, the movement of the second engaging portion 88 within the second guide rail 74 in the transport direction Y is not substantially permitted, the second engaging portion 88 is substantially not displaced in the transport direction Y with respect to the supporting member 70.

On the other hand, movement of the second engaging portion 88 within the insertion hole 80*h* of the plate member 80 is permitted. Thus, the second base portion 88*a* of the second engaging portion 88 moves to the downstream side Y2 in the transport direction Y within the insertion hole 80*h* along with rotation of the rotating portion 83. In other words, the plate member 80 moves relative to the second engaging portion 88 to the upstream side Y1 in the transport direction Y. The plate member 80 is also considered to move relative to the supporting member 70 to the upstream side Y1 in the transport direction Y.

Further, movement of the first engaging portion 81 within the first guide rail 73 is also permitted. Thus, the first engaging portion 81 moves in the first guide rail 73 to the upstream side Y1 in the transport direction Y, as the plate member 80 moves relative to the supporting member 70 to the upstream side Y1. The first protruding piece 81*b* is located outside the first recessed portion 73*d*, and the second protruding piece 81*c* is located within the second recessed portion 73*e*. The second protruding piece 81*c* is located within the second recessed portion 73*e*, thereby restricting the first engaging portion 81 from falling out of the first guide rail 73.

In addition, a shortest distance between the first base portion 81*a* of the first engaging portion 81 and the third protruding piece 88*b* of the second engaging portion 88 in the transport direction Y when the edge holders 78 and 79 are in the slide-enabled state is a second distance P2. The second distance P2 is greater than the inter-rail distance Q. Thus, a portion of the supporting member 70 located between the first guide rail 73 and the second guide rail 74 is not sandwiched in the transport direction Y by the first engaging portion 81 and the second engaging portion 88. Thus, the edge holders 78 and 79 can slide in the width direction X with respect to the supporting member 70.

Furthermore, in the present exemplary embodiment, the projection side tapered surface T81 is separated from the guide side tapered surface T73 in a state in which the second protruding piece 81*c* of the first engaging portion 81 is located within the second recessed portion 73*e*. Thus, ease of sliding of the first engaging portion 81 with respect to the first guide rail 73 in the width direction X becomes even better.

When adjusting respective positions of the edge holders 78 and 79 in the width direction X, the user slides the edge holders 78 and 79 in the width direction X while pinching the pair of gripping portions 87.

As illustrated in FIGS. 2 and 3, the printing apparatus 10 includes a maintenance unit 15. The maintenance unit 15 is accommodated within the housing 14. The maintenance unit 15 of the present exemplary embodiment includes a cap unit 51, a flushing box 52, a suction unit 53, and a wiper unit 54. The cap unit 51, the flushing box 52, the suction unit 53, and the wiper unit 54 are all maintenance devices used for maintenance of the liquid discharging head 37.

The cap unit 51 is provided on the first direction side X1 of the second support portion 11*b* in the width direction X. That is, the cap unit 51 is located in the second region A2. A first gap S1 is provided between the cap unit 51 and the second support portion 11*b* in the width direction X. A dimension LS1 of the first gap S1 in the width direction X is greater than a dimension L78 of the first edge holder 78 in the width direction X. Also, a depth of the first gap S1 in the vertical direction Z is also greater than the dimension L78 of the first edge holder 78 in the width direction X.

The flushing box 52, the suction unit 53, and the wiper unit 54 are provided on the second direction side X2 of the second support 11*b* in the width direction X. That is, the flushing box 52, the suction unit 53, and the wiper unit 54 are located in the third region A3. The flushing box 52, the suction unit 53, and the wiper unit 54 are aligned in this order toward the second direction side X2 in the width direction X. In other words, the flushing box 52 is disposed so as to be adjacent to the second support portion 11*b* in the width direction X.

A second gap S2 is provided between the flushing box 52 and the suction unit 53 in the width direction X. A dimension LS2 of the second gap S2 in the width direction X is less than a dimension L79 of the second edge holder 79 in the width direction X, and is greater than a dimension H79 in a thickness direction of the second edge holder 79. In addition, a depth of the second gap S2 in the vertical direction Z is greater than the dimension L79 of the second edge holder 79 in the width direction X.

The printing apparatus 10 can perform a maintenance operation for driving a desired maintenance device, after driving the carriage motor M32 to move the carriage 32 to a position corresponding to the desired maintenance device. Operations performed when each maintenance device is driven are as follows.

The cap unit 51 performs capping of the liquid discharging head 37. The "capping" refers to forming a closed space including an inside of the nozzle 38, by closing a space with which an opening of the nozzle 38 communicates. The capping is performed, for example, when printing is stopped, during an un-use, when powering is turned off, and the like. The capping is performed to suppress clogging of the nozzle 38, which may be caused by liquid in the nozzle 38 evaporating and thickening.

The cap unit 51 has a plate standby cap holder 55 having a standby cap 55*a*, and a cap unit motor M51 (see FIG. 3) for reciprocating the standby cap holder 55 in the vertical direction Z. The standby cap holder 55 of the present exemplary embodiment has four standby caps 55*a*. The four standby caps 55*a* are aligned in the width direction X. An upper surface of the standby cap 55*a* is also an upper surface of the cap unit 51.

As illustrated in FIG. 3, the standby cap holder 55 is movable between a capping position at which the standby cap 55*a* contacts the nozzle opening surface 37*a* of the liquid discharging head 37, by being driven by the cap unit motor M51, and a standby position at which the standby cap 55*a* does not contact the nozzle opening surface 37*a* of the liquid discharging head 37. In FIG. 3, the standby cap holder 55 at the standby position is illustrated. At this time, an upper surface of the standby cap 55*a* is located on the lower side Z2 of the first surface 80*a* of the plate member 80 of the first edge holder 78 in a state in which the first engaging portion 81 is engaged with the first guide rail 73 and the second engaging portion 88 is engaged with the second guide rail 74.

When performing the capping, the printing apparatus 10 causes the carriage 32 to perform scanning to a position corresponding to the standby cap holder 55 in the width direction X, and causes the respective standby caps 55*a* to face the nozzles 38 of the liquid discharging head 37. Thereafter, when the cap unit motor M51 is driven to move up the standby cap holder 55 at the standby position to the capping position, each standby cap 55*a* closes a space in communication with the opening of the nozzle 38. Accordingly, a closed space is formed by the inside of the nozzle 38 and the standby cap 55*a*, and the liquid discharging head 37 is capped. When the capping is finished, such as when printing is resumed, the cap unit motor M51 is driven to move down the standby cap holder 55 at the capping position and move to the standby position.

The flushing box 52 receives liquid discharged from the liquid discharging head 37 by flushing. The flushing is an operation of expelling foreign materials, air bubbles, and altered liquid, for example thickened ink, which cause a discharge failure, by expelling liquid from the nozzle 38 of the liquid discharging head 37. The flushing is performed to resolve a minor discharge failure.

The flushing box 52 has a rectangular bottom wall 52*a* and a peripheral wall 52*b* erected from a periphery of the bottom wall 52*a*. A dimension L52 of the flushing box 52 in the width direction X is greater than the size L79 of the second edge holder 79. A tip surface 52*c* of the peripheral wall 52*b* located at a tip in a protruding direction of the peripheral wall 52*b* from the bottom wall 52*a* is also an upper surface of the flushing box 52. The flushing box 52 is disposed such that the tip surface 52*c* of the peripheral wall 52*b* is located on the lower side Z2 of the first surface 80*a* of the plate member 80 of the second edge holder 79 in a state in which the first engaging portion 81 is engaged with the first guide rail 73 and the second engaging portion 88 is engaged with the second guide rail 74.

The flushing box 52 has a receiving opening 52*d* that opens toward the upper side Z1 in the vertical direction Z. In the present exemplary embodiment, a dimension W52*d* of the receiving opening 52*d* in the transport direction Y is shorter than a dimension W79 of the second edge holder 79 in the transport direction Y.

A flushing tube 56 is coupled to the bottom wall 52*a* of the flushing box 52. An inside of the flushing box 52 is coupled to a waste liquid accommodation portion 57 via the flushing tube 56. An inner surface of the bottom wall 52*a* is a surface that inclines toward the lower side Z2 as the inner surface extends toward the flushing tube 56.

When performed flushing, the printing apparatus 10 causes the carriage 32 to perform scanning to a position corresponding to the flushing box 52 in the width direction X, and causes the nozzle opening surface 37*a* of the liquid discharging head 37 to face the bottom wall 52*a* of the flushing box 52. Subsequently, liquid discharged from the nozzle 38 by the liquid discharging head 37 performing the flushing is accommodated by the flushing box 52. The liquid accommodated by the flushing box 52 is sent through the flushing tube 56 to the waste liquid accommodation portion 57.

The suction unit 53 performs suction cleaning for the nozzle 38 of the liquid discharging head 37. The suction cleaning is an operation of suctioning air bubbles, foreign materials, and the like inside the nozzle 38 from the nozzle 38 along with liquid.

The suction unit 53 has a suction cap holder 58 having a ring-shaped suction cap 58*a*, a suction unit motor M53 (see FIG. 3) for reciprocating the suction cap holder 58 in the vertical direction Z, and a suction pump 59 (see FIG. 3) provided at the suction cap holder 58. The suction cap holder 58 of the present exemplary embodiment has one suction cap 58*a*. An upper surface of the suction cap 58*a* is also an upper surface of the suction unit 53. The suction pump 59 is coupled to the waste liquid accommodation portion 57.

The suction cap holder 58 is movable between a cleaning position at which the suction cap 58*a* contacts the nozzle opening surface 37*a* of the liquid discharging head 37 by driving of the suction unit motor M53, and a standby position at which the suction cap 58*a* does not contact the liquid discharging head 37. FIG. 3 illustrates the suction cap holder 58 at the standby position. At this time, an upper surface of the suction cap 58*a* is located on the lower side Z2 of the first surface 80*a* of the plate member 80 of the second edge holder 79 in a state in which the first engaging portion 81 is engaged with the first guide rail 73 and the second engaging portion 88 is engaged with the second guide rail 74.

When performing suction cleaning, the printing apparatus 10 causes the carriage 32 to perform scanning to a position corresponding to the suction cap holder 58 in the width direction X, and causes the suction cap 58*a* to face one nozzle 38 of the four nozzles 38 included in the liquid discharging head 37. Subsequently, when the suction cap holder 58 at the standby position moves up and moves to the cleaning position by driving of the suction unit motor M53, the suction cap 58*a* contacts the nozzle opening surface 37*a* of the liquid discharging head 37 and surrounds the nozzle 38. In this state, the suction pump 59 suctions air inside the suction cap holder 58, so that a negative pressure acts on the nozzle 38 via the suction cap 58*a*. Accordingly, liquid is forcibly discharged from the nozzle 38, and the suction cleaning is performed for the liquid discharging head 37. The liquid suctioned by the suction pump 59 is supplied to the waste liquid accommodation portion 57. When the suction cleaning is complete, the suction cap holder 58 at the cleaning position is moved down and moved to the standby position by driving of the suction unit motor M53.

In the suction unit 53 of the present exemplary embodiment, the suction cleaning is performed for one nozzle 38 in a single suction cleaning operation. Thus, when performing the suction cleaning on a plurality of the nozzles 38, the printing apparatus 10 needs to repeatedly perform movement operation of the carriage 32, and the suction cleaning operation for the suction unit 53. On the other hand, the suction unit 53 can be made smaller in the width direction X as compared to a case where the suction cap 58*a* with a large diameter is employed as described below, or a case where the suction cap holder 58 has a plurality of the suction caps 58*a*, thus, an increase in size of the printing apparatus 10 in the width direction X can be suppressed.

Note that, a size and the number of the suction cap 58*a* may be appropriately changed. For example, the suction cap 58*a* may be a suction cap with a large diameter that surrounds two nozzles 38. In this case, the two nozzles 38 are subjected to the suction cleaning by one suction cleaning operation. Thus, when performing the suction cleaning for all the four nozzles 38, whereas four suction cleaning operations are necessary in the present exemplary embodiment, the number of times of the suction cleaning operation can be omitted to two in the above example. Also, the suction cap holder 58 may have four suction caps 58*a* to accommodate the number of nozzles 38 included in the liquid discharging head 37. In this case, since the suction caps 58*a* and the nozzles 38 can be caused to face respectively, all the four nozzles 38 are subjected to the suction cleaning by one suction cleaning operation. In other words, the number of suction cleaning operations can be omitted to one.

The wiper unit 54 performs wiping for the nozzle opening surface 37*a* of the liquid discharging head 37. The wiping is an action of wiping liquid, dust, or the like adhering to the nozzle opening surface 37*a*. The wiping is performed, for example, after a printing operation. Note that, since liquid may adhere to the nozzle opening surface 37*a* even after suction cleaning, the nozzle opening surface 37*a* may be wiped by wiping, even after the suction cleaning. Note that, when the wiping is performed, a meniscus formed in the nozzle 38 (a concavely curved liquid surface) may be disrupted, thus flushing may be performed after the wiping is performed to condition the meniscus in the nozzle 38.

The wiper unit 54 includes a wiping member 61 capable of wiping the nozzle opening surface 37*a*, a holding portion 62 holding the wiping member 61, and a rail portion 63 extending along the transport direction Y.

The wiping member 61 is formed of a non-woven fabric such as a synthetic resin, for example. When the wiping member 61 contacts the nozzle opening surface 37*a* to which liquid adheres, the liquid adhering to the nozzle opening surface 37*a* is absorbed by a gap (air gap) between fibers forming the wiping member 61. Note that, the wiping member 61 may be a woven fabric of synthetic fibers, or may be a woven fabric or non-woven fabric of natural fibers, as long as liquid can be absorbed.

The holding portion 62 has a box-shaped wiper holder 64, and a wiper cassette 65 detachably mounted in the wiper holder 64. The wiper holder 64 is attached to the rail portion 63 via an attachment member (not illustrated). A slit 64*b* extending along the width direction X is formed in an upper surface 64*a* of the wiper holder 64. The holding portion 62 moves along the rail portion 63, by driving of a first wiper motor M64. In other words, the holding portion 62 moves along the transport direction Y, by the driving of the first wiper motor M64.

The wiper cassette 65 rotatably holds a winding roller 65*a*, a press roller 65*b*, and a feeding roller 65*c*. The winding roller 65*a*, the press roller 65*b*, and the feeding roller 65*c* are aligned in this order in the transport direction Y. An axial direction of the winding roller 65*a*, the press roller 65*b*, and the feeding roller 65*c* is the width direction X. The winding roller 65*a* is rotated by driving of a second wiper motor M65. The press roller 65*b* is provided along the slit 64*b* in the transport direction Y. In addition, a support shaft (not illustrated) that supports the press roller 65*b* is biased toward the upper side Z1 in the vertical direction Z by a biasing member (not illustrated).

A starting end in a longitudinal direction of the wiping member 61 is wound on the winding roller 65*a*, while an ending end in the longitudinal is wound on the feeding roller 65*c*. A wiping portion 61*a*, which is a portion set between the feeding roller 65*c* and the winding roller 65*a* in the wiping member 61 is pressed toward the upper side Z1, by the press roller 65*b* that is biased toward the upper side Z1 by a biasing member (not illustrated). Accordingly, the wiping portion 61*a* of the wiping member 61 protrudes from the upper surface 64*a* of the wiper holder 64, through the slit 64*b*.

When performing the wiping, the printing apparatus 10 causes the carriage 32 to perform scanning to a position corresponding to the holding portion 62 in the width direction X. Then, by moving the holding portion 62 in the transport direction Y, the wiping portion 61*a* wipes the nozzle opening surface 37*a* while absorbing liquid adhering to the nozzle opening surface 37*a*. Accordingly, the wiping is performed for the liquid discharging head 37. In addition, by rotating the winding roller 65*a*, the wiping portion 61*a* is wound on the winding roller 65*a*, and the wiping member 61 is unwound from the feeding roller 65*c* by a length that is wound. In other words, in the wiping member 61, a used portion after absorbing liquid is wound on the winding roller 65*a*, and an unused portion becomes a new wiping portion 61*a*.

Here, in the present exemplary embodiment, during a printing operation, upper surfaces of a plurality of main unit components that constitute an upper surface in a second retraction region B2 are an upper surface of the flushing box 52, an upper surface of the suction unit 53, and an upper surface 64*a* of the wiper holder 64. During the printing operation, the upper surface of the flushing box 52, the upper surface of the suction unit 53, and the upper surface 64*a* of the wiper holder 64 are set to be low in height in stages in this order in which the upper surfaces are separated from the second side surface 70*b* of the supporting member 70 to the second direction side X2. Compared to a configuration in which the order of the heights is reversed, the upper surface in the second retraction region B2 has surface structure in which the second edge holder 79 when retracted to the second retraction region B2 is unlikely to catch on the upper surface in the second retraction region B2.

Figure 11:
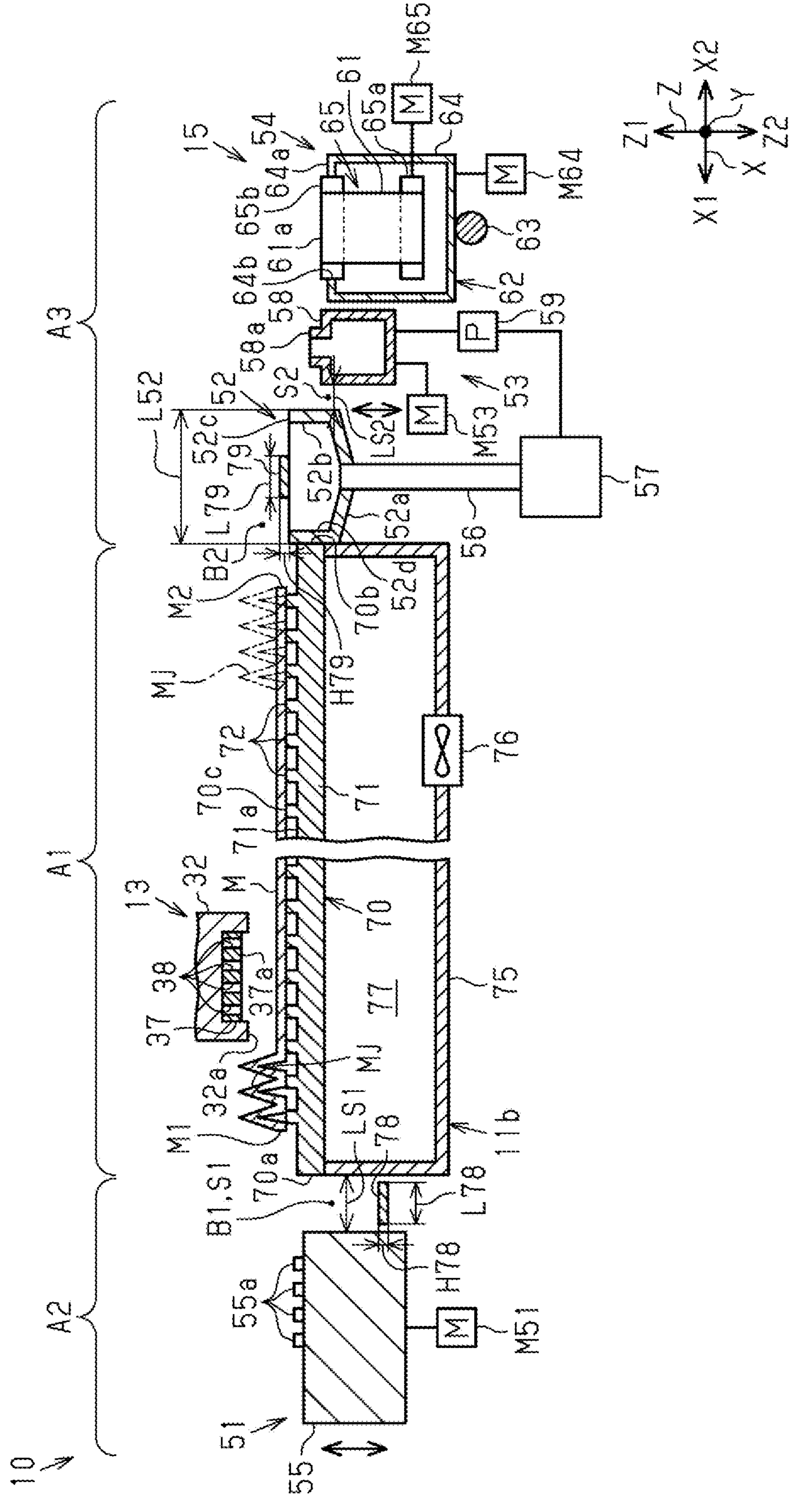
FIG. 11 is a cross-sectional view taken along a line 11-11 in FIG. 10.

Incidentally, as illustrated in FIG. 11, in the printing apparatus 10, a medium jam (paper jam) may occur. For example, when the carriage 32 is caused to perform scanning in the width direction X, with a starting end portion and an ending end portion of the medium M in the longitudinal direction floating from the support face 70*c* of the supporting member 70, the carriage 32 interferes with a floating portion of the medium M, and the medium M is pulled along with the carriage 32 in the width direction X, and thus a medium jam occurs. A portion of the medium M that is wrinkled by a medium jam is referred to as a jam portion Mj. For example, when the carriage 32 contacts the medium M floating from the support face 70*c* of the supporting member 70, when the carriage 32 is caused to perform scanning to the second direction side X2 from a state in which the carriage 32 is located on the first direction side X1 of the first end portion M1 of the medium M in the width direction X, the first end portion M1 of the medium M becomes the jam portion Mj, as indicated by a solid line in FIG. 11. This jam portion Mj is pressed by the carriage 32, which is caused to perform scanning to the second direction side X2, and moves with the carriage 32 to the second direction side X2. In addition, when the carriage 32 contacts the medium M floating from the support face 70*c* of the supporting member 70, when the carriage 32 is caused to perform scanning to the first direction side X1 from a state in which the carriage 32 is located on the second direction side X2 of the second end portion M2 of the medium M in the width direction X, the second end portion M2 of the medium M becomes the jam portion Mj, as indicated by a two-dot chain line in FIG. 11. This jam portion Mj is pressed by the carriage 32, which is caused to perform scanning to the first direction side X1, and moves with the carriage 32 to the first direction side X1. Note that, when a central portion of the medium M in the width direction X is floating, the floating portion of the medium M may contact the carriage 32 during scanning and become the jam portion Mj.

When the carriage 32 is caused to perform scanning to the first direction side X1 in the width direction X with a medium jam occurring, the carriage 32 presses the first edge holder 78 to the first direction side X1 in the width direction X via the jam portion Mj of the medium M. That is, the carriage 32 indirectly presses the first edge holder 78 to the first direction side X1. Further, when the carriage 32 is caused to perform scanning to the second direction side X2 in the width direction X with a medium jam occurring, the carriage 32 presses the second edge holder 79 to the second direction side X2 in the width direction X via the jam portion Mj of the medium M. That is, the carriage 32 indirectly presses the second edge holder 79 to the second direction side X2.

At this time, magnitude of force that the carriage 32 presses the edge holders 78 and 79 is magnitude large enough to slide the edge holders 78 and 79 in the slide-regulated state in the width direction X. Thus, the first edge holder 78 is pressed by the carriage 32, and thus is slid to the first direction side X1 in the width direction X, in a state in which the first engaging portion 81 is along the first guide rail 73, and the second engaging portion 88 is along the second guide rail 74. Further, the second edge holder 79 is pressed by the carriage 32, and thus is slid to the second direction side X2 in the width direction X, in a state in which the first engaging portion 81 is along the first guide rail 73, and the second engaging portion 88 is along the second guide rail 74.

As described above, the respective first end portions 73*x* and 74*x* of the first guide rail 73 and the second guide rail 74 are open to the first side surface 70*a* of the supporting member 70. Thus, when the first edge holder 78 is slid to the first direction side X1, an engaging state between the first engaging portion 81 and the first guide rail 73 is released, and an engaging state between the second engaging portion 88 and the second guide rail 74 is released. Also, the respective second end portions 73*y* and 74*y* of the first guide rail 73 and the second guide rail 74 open to the first side surface 70*a* of the supporting member 70. Thus, when the second edge holder 79 is slid to the second direction side X2, an engaging state between the first engaging portion 81 and the first guide rail 73 is released, and an engaging state between the second engaging portion 88 and the second guide rail 74 is released.

Figure 10:
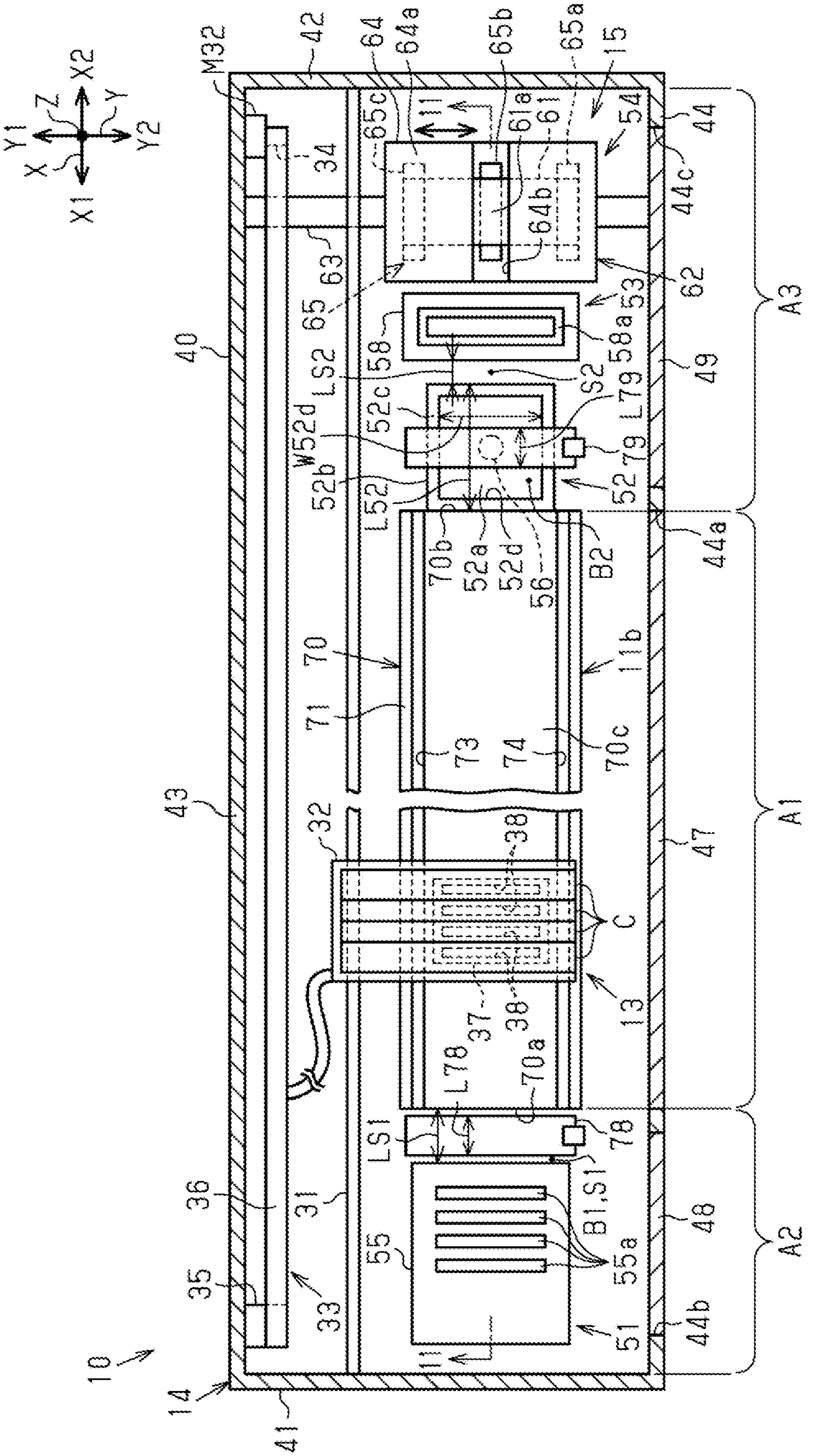
FIG. 10 is a cross-sectional view of the printing apparatus when a medium jam occurs.

A first retraction region B1 is provided inside the housing 14 in which the first edge holder 78 can be disposed in a state in which an engaging state between the first engaging portion 81 and the first guide rail 73 is released, and an engaging state between the second engaging portion 88 and the second guide rail 74 is released. The first retraction region B1 is provided on the first direction side X1 of the respective first end portions 73*x* and 74*x* of the first guide rail 73 and the second guide rail 74 in the width direction X. In other words, the first retraction region B1 is located on the first direction side X1 of the first side surface 70*a* of the supporting member 70 in the width direction X. FIGS. 10 and 11 illustrate a state in which the first edge holder 78 is retracted to the first retraction region B1.

A member that prevents movement of the first edge holder 78 toward the first direction side X1 is not disposed in the first retraction region B1. Here, "a member that prevents movement of the first edge holder 78 toward the first direction side X1" refers to a member having a portion where an end portion of the plate member 80 located on the first direction side X1 in the width direction X contacts, when the first edge holder 78 moves toward the first direction side X1. Additionally, a dimension of the first retraction region B1 in the width direction X may be set to be larger than the dimension L78 of the first edge holder 78 in the width direction X.

In the present exemplary embodiment, a part of the second region A2 is the first retraction region B1, and more specifically, the first gap S1 is the first retraction region retraction region B1. Thus, a member that prevents movement of the first edge holder 78 toward the first direction side X1 is not disposed in the first retraction region B1. In addition, the dimension of the first retraction region B1 in the width direction X corresponds to the dimension LS1 of the first gap S1 in the width direction X, and the dimension LS1 of the first gap S1 is set to be larger than the dimension L78 of the first edge holder 78.

As described above, the main body portion 40 of the housing 14 has the second opening 44*b* at a position corresponding to the second region A2. That is, the main body portion 40 of the housing 14 has the second opening 44*b* at a position corresponding to the first retraction region B1. Thus, the user can retrieve the first edge holder 78 retracted to the first retraction region B1 by opening the second cover 48.

The second retraction region B2 is provided inside the housing 14 in which the second edge holder 79 can be disposed in a state in which an engaging state between the first engaging portion 81 and the first guide rail 73 is released, and an engaging state between the second engaging portion 88 and the second guide rail 74 is released. The second retraction region B2 is provided on the second direction side X2 of the respective second end portions 73*y* and 74*y* of the first guide rail 73 and the second guide rail 74 in the width direction X. In other words, the second retraction region B2 is located on the second direction side X2 of the second side surface 70*b* of the supporting member 70 in the width direction X. FIGS. 10 and 11 illustrate a state in which the second edge holder 79 is retracted to the second retraction region B2.

A member that prevents movement of the second edge holder 79 toward the second direction side X2 is not disposed in the second retraction region B2. Here, "a member that prevents movement of the second edge holder 79 toward the second direction side X2" refers to a member having a portion where an end portion of the plate member 80 located on the second direction side X2 in the width direction X contacts, when the second edge holder 79 moves toward the second direction side X2. Additionally, a dimension of the second retraction region B2 in the width direction X may be set to be larger than the dimension L79 of the second edge holder 79 in the width direction X.

In the present exemplary embodiment, a part of the third region A3 is the second retraction region B2, and more specifically, a space on the upper side Z1 of the flushing box 52 is the second retraction region B2. As described above, the flushing box 52 is disposed such that the tip surface 52*c* of the peripheral wall 52*b* is located on the lower side Z2 of the first surface 80*a* of the plate member 80 of the second edge holder 79 in a state in which the first engaging portion 81 is engaged with the first guide rail 73 and the second engaging portion 88 is engaged with the second guide rail 74. Thus, the flushing box 52 does not become a member that prevents movement of the second edge holder 79. Also, the dimension of the second retraction region B2 in the width direction X corresponds to the dimension L52 of the flushing box 52 in the width direction X, and the dimension L52 of the flushing box 52 is set to be larger than the dimension L79 of the second edge holder 79.

As described above, the main body portion 40 of the housing 14 has the third opening 44*c* at the position corresponding to the third region A3. That is, the main body portion 40 of the housing 14 has the third opening 44*c* at a position corresponding to the second retraction region B2. Thus, the user can retrieve the second edge holder 79 retracted to the second retraction region B2 by opening the third cover 49.

Next, actions of the present embodiment will be described.

On the first direction side X1 of the first end portions 73*x* and 74*x* of the respective first and second guide rails 73 and 74 in the width direction X, the first retraction region B1 is provided in which the first edge holder 78 can be disposed in a state in which an engaging state between the first guide rail 73 and the first engaging portion 81, and an engaging state between the second guide rail 74 and the second engaging portion 88 are released. Thus, when a jam occurs in the medium M, and the carriage 32 presses the first edge holder 78 toward the first direction side X1 via the jam portion Mj of the medium M, the first edge holder 78 moves to the first retraction region B1 as illustrated in FIGS. 10 and 11. Specifically, an entirety of the first edge holder 78 falls into the first gap S1. Thus, compared to a case where the first edge holder 78 is fixed to the supporting member 70, and cannot move in the width direction X, a load applied to the first edge holder 78 is reduced.

Also, the depth of the first gap S1 is greater than the dimension L78 of the first edge holder 78, and thus, even if the first edge holder 78 falling into the first gap S1 is oriented such that an orientation in a thickness direction thereof is the width direction X, a part of the first edge holder 78 falling into the first gap S1 does not protrude to a position higher than the support face 70*c* of the supporting member 70 in the vertical direction Z. Thus, a collision between the part of the first edge holder 78 falling into the first gap S1 and the carriage 32 is avoided.

In addition, on the second direction side X2 of the second end portions 73*y* and 74*y* of the respective first and second guide rails 73 and 74 in the width direction X, the second retraction region B2 is provided in which the second edge holder 79 can be disposed in a state in which an engaging state between the first guide rail 73 and the first engaging portion 81, and an engaging state between the second guide rail 74 and the second engaging portion 88 are released. Thus, when a jam occurs in the medium M, and the carriage 32 presses the second edge holder 79 toward the second direction side X2 via the jam portion Mj of the medium M, the second edge holder 79 moves to the second retraction region B2 as illustrated in FIGS. 10 and 11. Specifically, the second edge holder 79 is disposed so as to span the flushing box 52 in the transport direction Y. Thus, compared to a case where the second edge holder 79 is fixed to the supporting member 70 and cannot move in the width direction X, a load applied to the second edge holder 79 is reduced.

Effects of the present embodiment will now be described.

(1) when a jam occurs in the medium M, and the carriage 32 presses the first edge holder 78 toward the first direction side X1 via the jam portion Mj of the medium M, the first edge holder 78 moves to the first retraction region B1. Thus, compared to a case where the first edge holder 78 is fixed to the supporting member 70 and cannot move in the width direction X, and a case where the first edge holder 78 can move along the guide rails 73 and 74 to the first direction side X1 in the width direction X but further movement is regulated by the first end portions 73*x* and 74*x*, a load applied to the first edge holder 78 is reduced. Thus, damage to the first edge holder 78 can be suppressed.

Further, when a jam occurs in the medium M, and the carriage 32 presses the second edge holder 79 toward the second direction side X2 via the jam portion Mj of the medium M, the second edge holder 79 moves to the second retraction region B2. Thus, compared to a case where the second edge holder 79 is fixed to the supporting member 70 and cannot move in the width direction X, and a case where the second edge holder 79 can move along the guide rails 73 and 74 to the second direction side X2 in the width direction X but further movement is regulated by the second end portions 73*y* and 74*y*, a load applied to the second edge holder 79 is reduced. Thus, damage to the second edge holder 79 can be suppressed.

(2) Each of the guide rails 73 and 74 is continuous with the first side surface 70*a* of the supporting member 70. In other words, the first retraction region B1 is located on the first direction side X1 of the first side surface 70*a* of the supporting member 70. Thus, the first edge holder 78 can be retracted from above the supporting member 70.

Additionally, each of the guide rails 73 and 74 is continuous with the second side surface 70*b* of the supporting member 70. In other words, the second retraction region B2 is located farther on the second direction side X2 of the second side surface 70*b* of the supporting member 70. Thus, the second edge holder 79 can be retracted from above the supporting member 70.

(3) The supporting member 70 has the second guide rail 74 extending along the width direction X at a position different from that of the first guide rail 73 in the transport direction Y. The edge holders 78 and 79 each have the second engaging portion 88 that is engaged with the second guide rail 74. Thus, compared to a case where the edge holders 78 and 79 are each attached to the supporting member 70 only by engaging between the first guide rail 73 and the first engaging portion 81, inclination with respect to the transport direction Y can be suppressed when the edge holders 78 and 79 move to the retraction region B1 and B2 respectively.

(4) When a portion of the supporting member 70 located between the first guide rail 73 and the second guide rail 74 is not sandwiched in the transport direction Y by the first engaging portion 81 and the second engaging portion 88, a difference between displacement of the first engaging portion 81 with respect to the first guide rail 73 and displacement of the second engaging portion 88 with respect to the second guide rail 74 is likely to be large, when the edge holders 78 and 79 move to the retraction region B1 and B2 respectively. Accordingly, the edge holders 78 and 79 may be inclined with respect to the transport direction Y.

Compared to this, in the present exemplary embodiment, a portion of the supporting member 70 located between the first guide rail 73 and the second guide rail 74 is sandwiched in the transport direction Y by the first engaging portion 81 and the second engaging portion 88. Accordingly, a difference between displacement of the first engaging portion 81 with respect to the first guide rail 73 and displacement of the second engaging portion 88 with respect to the second guide rail 74 is decreased, when the edge holders 78 and 79 move to the retraction region B1 and B2 respectively. Thus, inclination of each of the edge holders 78 and 79 with respect to the transport direction Y can be further suppressed.

(5) The flushing box 52 as the maintenance device used to maintain the liquid discharging head 37 is disposed on the second direction side X2 of the supporting member 70 in the width direction X. The upper surface of the flushing box 52 is located on the lower side Z2 of the first surface 80*a* of the plate member 80 in a state in which the first engaging portion 81 and the second engaging portion 88 are engaged with the guide rails 73 and 74 respectively. Thus, the space on the upper side Z1 of the flushing box 52 becomes the second retraction region B2. In this configuration, for example, compared to a case where a gap is provided between the supporting member 70 and the maintenance device in the width direction X, and the gap is used as a retraction region, an increase in size in the width direction X of the printing apparatus 10 can be suppressed.

(6) The flushing box 52 has the receiving opening 52*d* that opens to the upper side Z1 in the vertical direction Z. The dimension W52*d* of the receiving opening 52*d* in the transport direction Y is shorter than the dimension W79 of the second edge holder 79 in the transport direction Y. Thus, the second edge holder 79 moved to the second retraction region B2 is disposed so as to span the flushing box 52 in the transport direction Y. Thus, it is possible to avoid the second edge holder 79 from falling into the receiving opening 52*d* of the flushing box 52.

(7) The housing 14 has the second opening 44*b* at the position corresponding to the first retraction region B1 in the width direction X. Thus, the user can retrieve the first edge holder 78 moved to the first retraction region B1 from the second opening 44*b*. Further, the housing 14 has the third opening 44*c* at the position corresponding to the second retraction region B2 in the width direction X. Thus, the user can retrieve the second edge holder 79 moved to the second retraction region B2 from the third opening 44*c*.

(8) The housing 14 has the first opening 44*a* at the position corresponding to the first region A1 in the width direction X. Thus, the user can return the first edge holder 78 retrieved from the first retraction region B1 and the second edge holder 79 retrieved from the second retraction region B2 back onto the supporting member 70 from the first opening 44*a*. Specifically, the user can attach the edge holders 78 and 79 to the supporting member 70, by engaging the first engaging portion 81 of each of the retrieved edge holders 78 and 79 with the first guide rail 73, and engaging the second engaging portion 88 with the second guide rail 74.

(9) In the exemplary embodiment described above, the first gap S1 has been described as the first retraction region B1, however, for example, when the kinetic energy of the carriage 32 is large, or when a shape of the jam portion Mj is a shape that does not easily absorb impact, it is also conceivable to move the first edge holder 78 beyond the first gap S1 to the first direction side X1.

In the present exemplary embodiment, the upper surface of the standby cap holder 55 at the standby position is located on the lower side Z2 of the first surface 80*a* of the plate member 80 of the first edge holder 78 in the state in which the first engaging portion 81 is engaged with the first guide rail 73 and the second engaging portion 88 is engaged with the second guide rail 74. Thus, even when the first edge holder 78 pressed to the first direction side X1 reaches the cap unit 51 beyond the first gap S1, the standby cap 55*a* does not become a member that prevents movement of the first edge holder 78. That is, a space on the upper side Z1 of the cap unit 51 can also be the first retraction region B1.

(10) In the above exemplary embodiment, the space on the upper side Z1 of the flushing box 52 has been described as the second retraction region B2, however, for example, when kinetic energy of the carriage 32 is large, or when a shape of the jam portion Mj is a shape that does not easily absorb impact, it is also conceivable to move the second edge holder 79 to the second direction side X2 beyond the flushing box 52.

In the present exemplary embodiment, the second gap S2 is provided between the flushing box 52 and the suction unit 53. Accordingly, an entirety of the second edge holder 79 pressed toward the second direction side X2 may fall into the second gap S2. That is, the second gap S2 can also be the second retraction region B2. Additionally, the depth of the second gap S2 is greater than the dimension L79 of the second edge holder 79, and thus, a portion of the second edge holder 79 falling into the second gap S2 does not protrude to a position higher than the support face 70*c* of the supporting member 70 in the vertical direction Z. Thus, a collision between the portion of the second edge holder 79 falling into the second gap S2 and the carriage 32 can be avoided.

Further, the upper surface of the suction unit 53 at the standby position is located on the lower side Z2 of the first surface 80*a* of the plate member 80 of the second edge holder 79 in a state in which the first engaging portion 81 is engaged with the first guide rail 73 and the second engaging portion 88 is engaged with the second guide rail 74. Thus, even when the second edge holder 79 pressed toward the second direction side X2 reaches the suction unit 53 beyond the flushing box 52, the suction cap 58*a* does not become a member that prevents movement of the second edge holder 79. That is, a space on the upper side Z1 of the suction unit 53 can also be the second retraction region B2.

Figure 12:
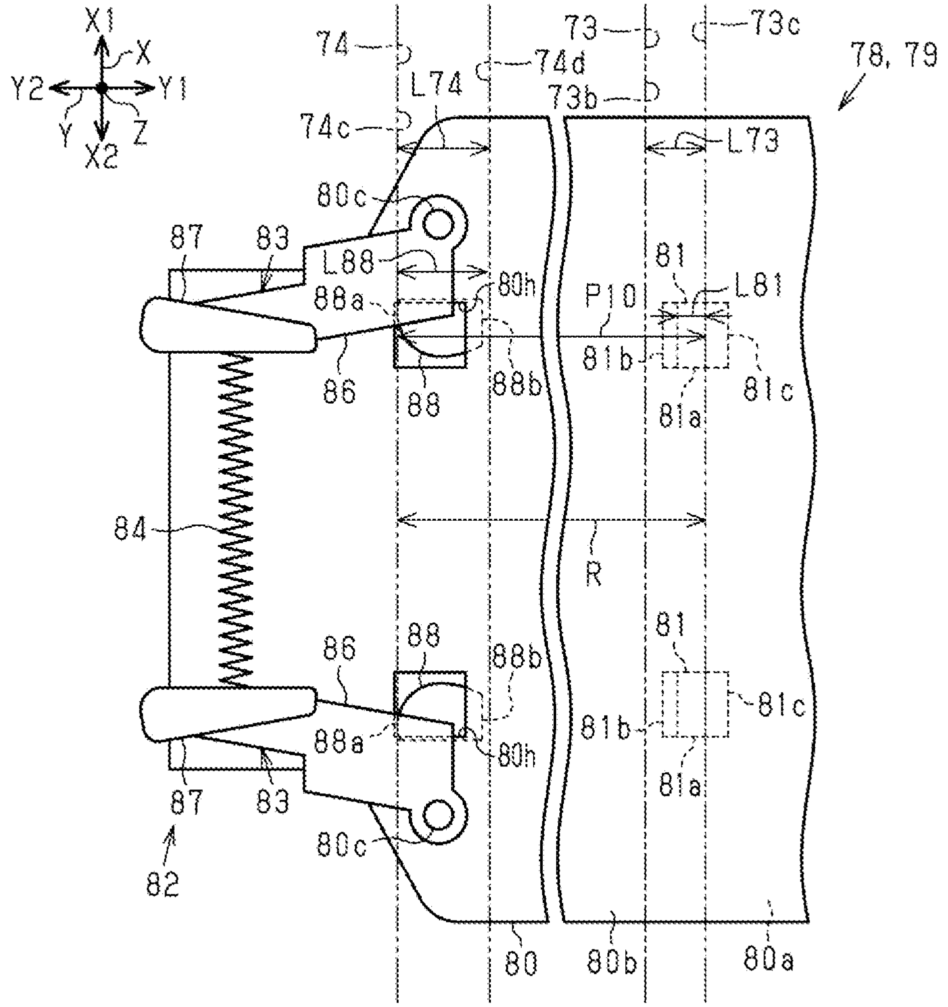
FIG. 12 is a plan view illustrating another example of the edge holder.
Figure 14:
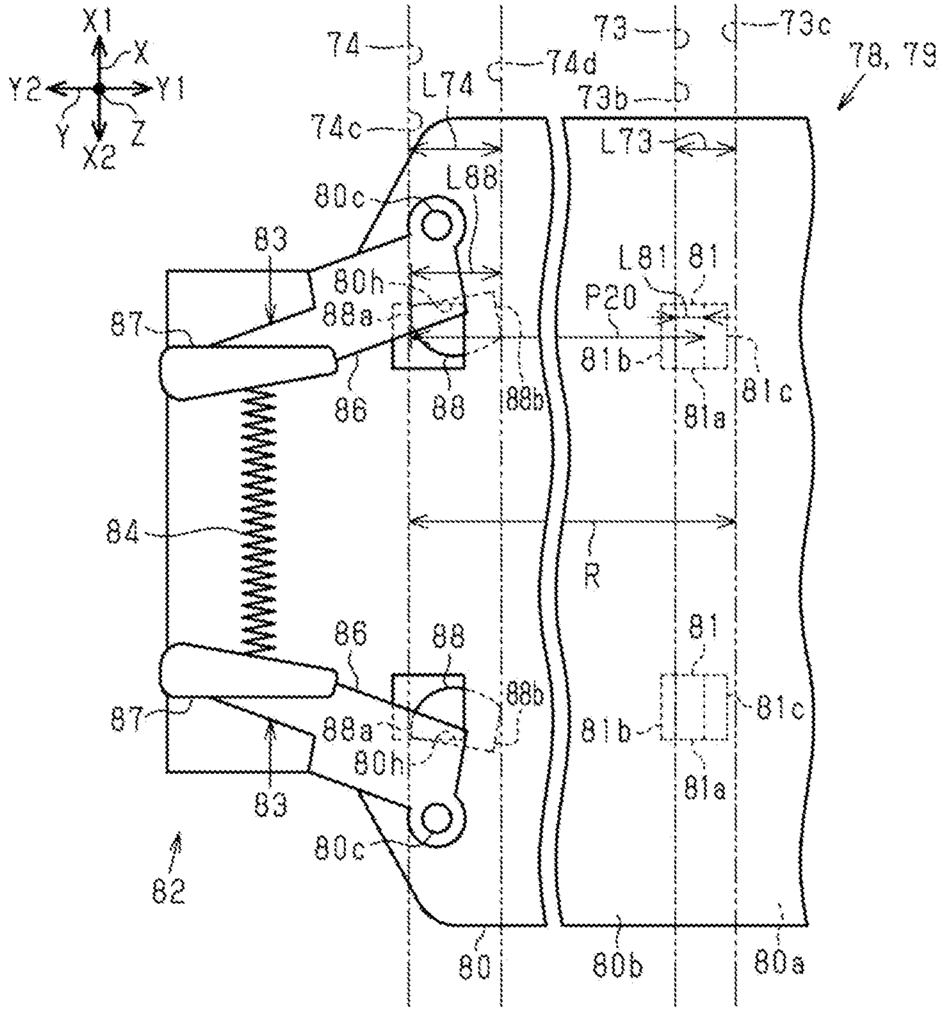
FIG. 14 is a plan view illustrating the other example of the edge holder.

(11) Since the edge holders 78 and 79 are each a member for pressing an end portion of the medium M, it is sufficient that a dimension in the short direction of the plate member 80 is approximately a few cm. At this time, as illustrated in FIGS. 12 and 14, when the pair of rotational movement shafts 80*c* are disposed so as to sandwich the pair of insertion holes 80*h* in the width direction X, there is a possibility that an interval between the pair of gripping portions 87 in the width direction X become narrower, and thus operability when the user pinches the pair of gripping portions 87 decreases. Compared to this, in the present exemplary embodiment, the pair of insertion holes 80*h* are disposed so as to sandwich the pair of rotational movement shafts 80*c* in the width direction X, and thus, the gap between the pair of gripping portions 87 in the width direction X can be made wider. Thus, the operability of the user when pinching the pair of gripping portion 87 is improved.

(12) Compared to a case where the operating portion 82 has scissors structure described below, a length of the pair of rotating portions 83 in the transport direction Y can be shortened, thus the edge holders 78 and 79 are made smaller in the transport direction Y. Thus, an increase in size of the printing apparatus 10 in the transport direction Y can be suppressed.

The present exemplary embodiment described above may be modified as follows. The present exemplary embodiment and modified examples thereof may be implemented in combination within a range in which a technical contradiction does not arise.

The supporting member 70 may be provided with only one of the first edge holder 78 and the second edge holder 79. Note that, when only the second edge holder 79 is provided in the second support portion 11*b*, the "second direction side X2" of the exemplary embodiment is a "first direction side" of the claims, and the "first direction side X1" of the exemplary embodiment is a "second direction side" of the claims.

The rib 72 of the supporting member 70 need not be provided. In this case, the support face 70*c* that supports the medium M in the supporting member 70 serves as the base surface 71*a* of the platen main body 71.

The supporting member 70 may have only one of the first guide rail 73 and the second guide rail 74. In this case, the first edge holder 78 and the second edge holder 79 also each have only one of the first engaging portion 81 engaged with the first guide rail 73, and the second engaging portion 88 engaged with the second guide rail 74.

The supporting member 70 may also have a guide rail in addition to the first guide rail 73 and the guide rail 74. That is, the supporting member 70 may have three or more guide rails. For example, when the supporting member 70 has a third guide rail in addition to the first guide rail 73 and the second guide rail 74, the first edge holder 78 and the second edge holder 79 each have a third engaging portion engaged with the third guide rail in addition to the first engaging portion 81 and the second engaging portion 88.

The first guide rail 73 may have a convex shape protruding from the base surface 71*a* of the platen main body 71, and the first engaging portion 81 may have a concave shape recessed from the first surface 80*a* of the plate member 80. Note that, when the first guide rail 73 is convex, an upper surface of the first guide rail 73 is located at an identical height to that of the tip surface of the rib 72, or on the lower side Z2 of the tip surface of the rib 72.

Additionally, the second guide rail 74 may have a convex shape protruding from the base surface 71*a* of the platen main body 71, and the second engaging portion 88 may have a concave shape recessed from the first surface 80*a* of the plate member 80. Note that, when the second guide rail 74 is convex, an upper surface of the second guide rail 74 is located at an identical height to that of the tip surface of the rib 72, or on the lower side Z2 of the tip surface of the rib 72.

When the first guide rail 73 and the second guide rail 74 are each convex, the guide rails 73 and 74 need not be provided across an entirety of the supporting member 70 in the width direction X. For example, the first guide rail 73 and the second guide rail 74 need not be formed at both end portions in the width direction X of the supporting member 70. In this case, the upper side Z1 of a portion where the first guide rail 73 and the second guide rail 74 are not formed in the width direction X of the supporting member 70 becomes a retraction region.

The configuration of the edge holders 78 and 79 may be changed as follows. Note that, a configuration of the operating portion 82 is substantially identical configuration to that in the above-described exemplary embodiment, thus descriptions thereof will be omitted.

As illustrated in FIGS. 12 and 14, the pair of rotational movement shafts 80*c* are disposed so as to sandwich the pair of insertion holes 80*h* in the width direction X.

Figure 13:
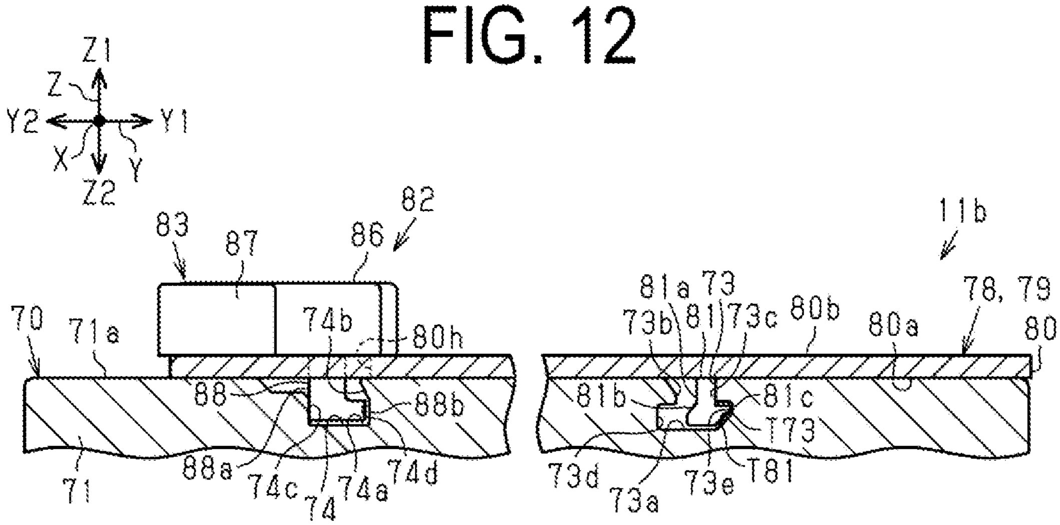
FIG. 13 is a cross-sectional view illustrating the other example of the edge holder.

In FIGS. 12 and 13, the edge holders 78 and 79 in the slide-regulated state are illustrated. At this time, since the user is not pinching the pair of gripping portions 87, the biasing member 84 biases the pair of rotating portions 83 such that the pair of arm portions 86 move away from each other in the width direction X. The second base portion 88*a* of the second engaging portion 88 is located on the downstream side Y2 in the transport direction Y within the insertion hole 80*h*. At this time, a longest distance between the first base portion 81*a* of the first engaging portion 81 and the second base portion 88*a* of the second engaging portion 88 in the transport direction Y is defined as a first distance P10. Additionally, a shortest distance between the second inner side surface 73*c* of the first guide rail 73 and the fourth inner side surface 74*c* of the second guide rail 74 in the transport direction Y is defined as an inter-rail distance R. The first distance P10 is less than or equal to the inter-rail distance R.

The second base portion 88*a* of the second engaging portion 88 biases the fourth inner side surface 74*c* to the downstream side Y2 in the transport direction Y. The first base portion 81*a* of the first engaging portion 81 biases the second inner side surface 73*c* to the upstream side Y1 in the transport direction Y. Additionally, the first protruding piece 81*b* is located outside the first recessed portion 73*d*, and the second protruding piece 81*c* is located inside the second recessed portion 73*e*. In other words, the first engaging portion 81 is located on the upstream side Y1 in the transport direction Y within the second guide rail 74. The second protruding piece 81*c* is located within the second recessed portion 73*e*, thereby restricting the first engaging portion 81 from falling out of the first guide rail 73.

When the edge holders 78 and 79 are in the slide-regulated state, the first engaging portion 81 presses a portion of the supporting member 70 located on the upstream side Y1 of the first guide rail 73, and the second engaging portion 88 presses a portion of the supporting member 70 located on the downstream side Y2 of the second guide rail 74. Thus, sliding in the width direction X of the edge holders 78 and 79 with respect to the supporting member 70 is regulated. In addition, pressing force that regulates the end portion of the medium M going to float by the plate member 80, and presses the end portion toward the supporting member 70 is generated in the edge holders 78 and 79.

Figure 15:
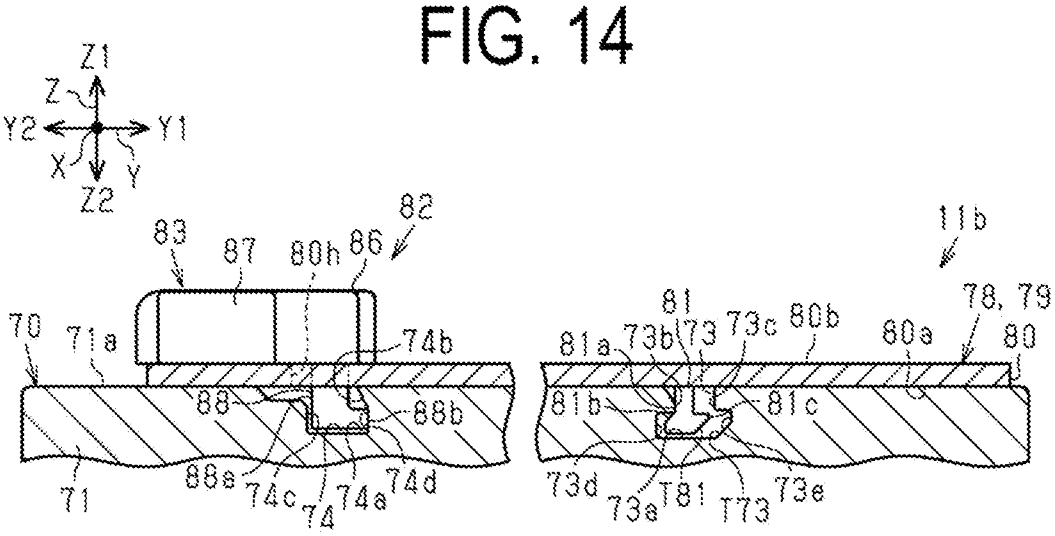
FIG. 15 is a cross-sectional view illustrating the other example of the edge holder.

In FIGS. 14 and 15, the edge holders 78 and 79 in a slide-enabled state are illustrated. When the user pinches the pair of gripping portions 87 so as to be brought closer to each other, the pair of rotating portions 83 rotate about the rotational movement shafts 80*c* respectively such that the pair of arm portions 86 are brought closer to each other. At this time, the movement of the second engaging portion 88 within the second guide rail 74 in the transport direction Y is not substantially permitted, the second engaging portion 88 is substantially not displaced in the transport direction Y with respect to the supporting member 70.

On the other hand, movement of the second engaging portion 88 within the insertion hole 80*h* of the plate member 80 is permitted. Thus, the second base portion 88*a* of the second engaging portion 88 moves to the upstream side Y1 in the transport direction Y within the insertion hole 80*h* as the rotating portion 83 rotates. In other words, the plate member 80 moves relative to the second engaging portion 88 to the downstream side Y2 in the transport direction Y. The plate member 80 is also considered to move relative to the supporting member 70 to the downstream side Y2 in the transport direction Y.

Further, movement of the first engaging portion 81 within the first guide rail 73 is also permitted. Thus, the first engaging portion 81 moves in the first guide rail 73 to the downstream side Y2 in the transport direction Y, as the plate member 80 moves relative to the supporting member 70 to the downstream side Y2. The first protruding piece 81*b* is located inside the first recessed portion 73*d*, and the second protruding piece 81*c* is located outside the second recessed portion 73*e*. The first protruding piece 81*b* is located within the first recessed portion 73*d*, thereby restricting the first engaging portion 81 from falling out of the first guide rail 73.

In addition, a longest distance between the first base portion 81*a* of the first engaging portion 81 and the second base portion 88*a* of the second engaging portion 88 in the transport direction Y when the edge holders 78 and 79 are in the slide-enabled state is a second distance P20. The second distance P20 is less than the inter-rail distance R. Thus, the first engaging portion 81 does not press a portion of the supporting member 70 located on the upstream side Y1 of the first guide rail 73, and the second engaging portion 88 also does not press a portion of the supporting member 70 located on the downstream side Y2 of the second guide rail 74. Thus, the edge holders 78 and 79 can slide in the width direction X with respect to the supporting member 70.

The configuration of the operating portion 82 may be changed as follows.

Figure 16:
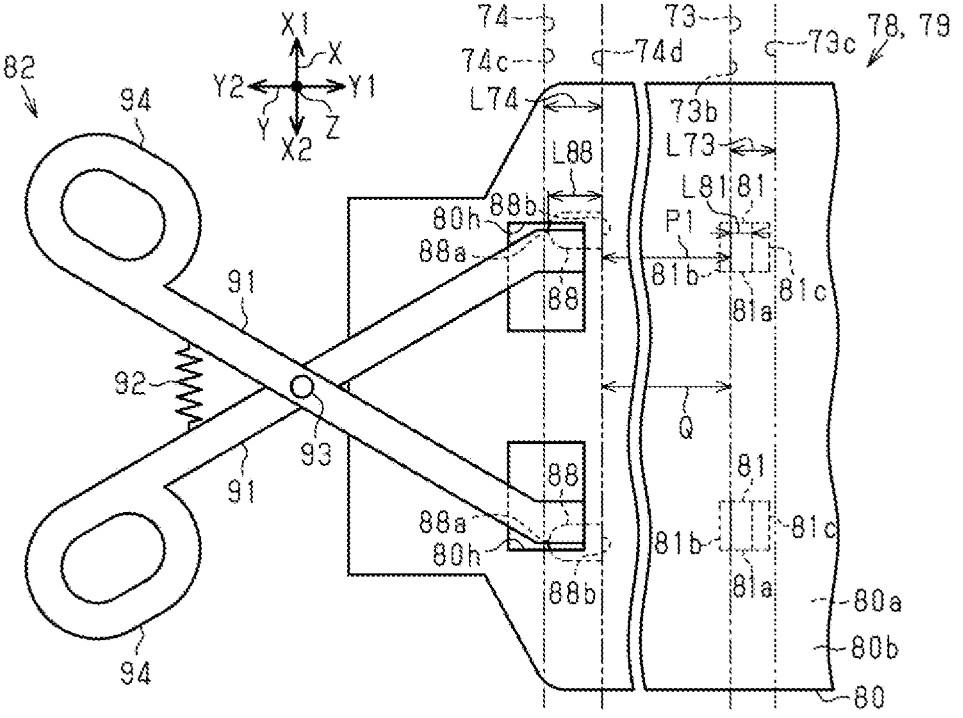
FIG. 16 is a plan view illustrating another example of an operating portion.
Figure 17:
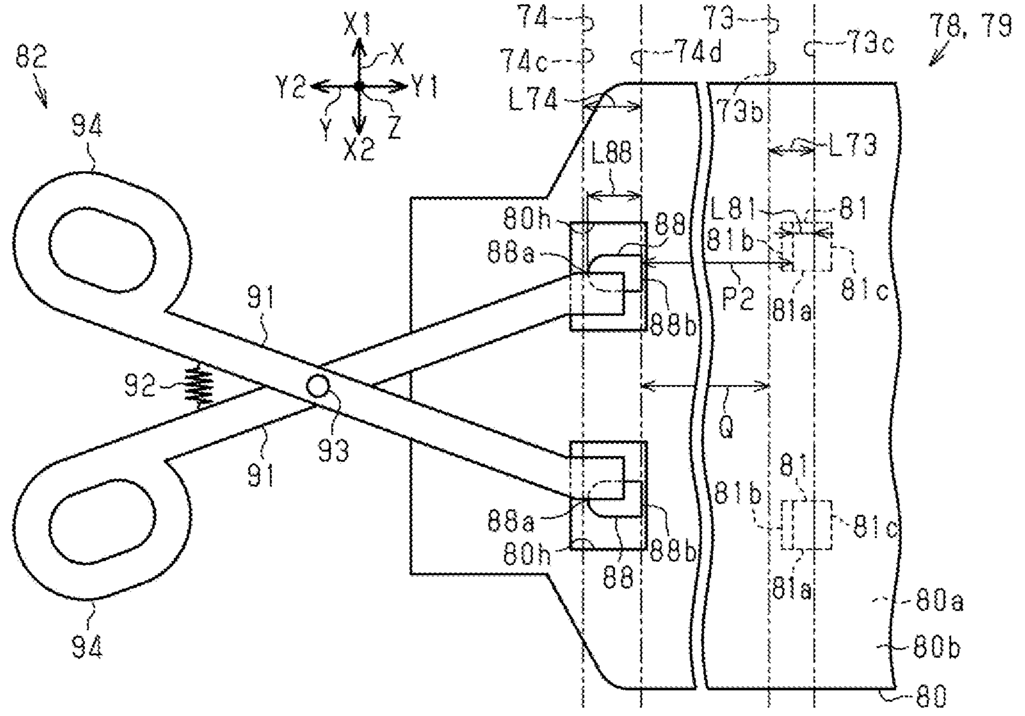
FIG. 17 is a plan view illustrating the other example of the operating portion.

As illustrated in FIGS. 16 and 17, the operating portion 82 has a pair of arm portions 91 and a biasing member 92. Respective center portions in a longitudinal direction of the arm portions 91 are coupled to each other by a coupling member 93 such that the pair of arm portions 91 are made to cross. At one end portions in the longitudinal direction of the respective arm portions 91, annular finger hook portions 94 are provided respectively, and the pair of second engaging portions 88 are provided at another end portions in the longitudinal direction of the arm portions 91, respectively. Similar to the exemplary embodiment described above, the second engaging portion 88 is inserted through the insertion hole 80*h* of the plate member 80, and is engaged with the second guide rail 74. The operating portion 82 has scissors structure in which the second engaging portion 88 is an action point, the coupling member 93 is a fulcrum, and the finger hook portion 94 is a force point.

The biasing member 92 is a coil spring. The biasing member 92 couples a portion located between the coupling member 93 and the finger hook portion 94 in the longitudinal direction of one arm portions 91 and a portion located between the coupling member 93 and the finger hook portion 94 in the longitudinal direction of another arm 91 in the width direction X.

In FIG. 16, the edge holders 78 and 79 in the slide-regulated state are illustrated. The biasing member 92 biases the pair of arm portions 91 such that portions each located between the coupling member 93 and the finger hook portion 94 in the longitudinal direction of the pair of arm portions 91 move away from each other in the width direction X. At this time, portions each located between the coupling member 93 and the second engaging portion 88 in the longitudinal direction of the pair of arm portions 91 are also biased so as to move away from each other.

The second base portion 88*a* of the second engaging portion 88 is located on the upstream side Y1 in the transport direction Y within the insertion hole 80*h*. At this time, a shortest distance between the first base portion 81*a* of the first engaging portion 81 and the third protruding piece 88*b* of the second engaging portion 88 in the transport direction Y is defined as a first distance P1. Additionally, a shortest distance between the first inner side surface 73*b* of the first guide rail 73 and the recessed portion bottom surface of the third recessed portion 74*d* of the second guide rail 74 in the transport direction Y is referred to as an inter-rail distance Q. The first distance P1 is less than or equal to the inter-rail distance Q.

The third protruding piece 88*b* of the second engaging portion 88 biases the recessed portion bottom surface of the third recessed portion 74*d* toward the upstream side Y1 in the transport direction Y. The first base portion 81*a* of the first engaging portion 81 biases the first inner side surface 73*b* toward the downstream side Y2 in the transport direction Y. Additionally, the first protruding piece 81*b* is located within the first recessed portion 73*d*, and the second protruding piece 81*c* is located outside the second recessed portion 73*e*. In other words, the first engaging portion 81 is located on the downstream side Y2 in the transport direction Y within the second guide rail 74. The first protruding piece 81*b* is located within the first recessed portion 73*d*, thereby restricting the first engaging portion 81 from falling out of the first guide rail 73.

When the edge holders 78 and 79 are in the slide-regulated state, the first engaging portion 81 and the second engaging portion 88 sandwich a portion of the supporting member 70 between the first guide rail 73 and the second guide rail 74 in the transport direction Y. Thus, sliding in the width direction X of the edge holders 78 and 79 with respect to the supporting member 70 is regulated. In addition, pressing force that regulates the end portion of the medium M going to float by the plate member 80, and presses the end portion toward the supporting member 70 is generated in the edge holders 78 and 79.

In FIG. 17, the edge holders 78 and 79 in the slide-enabled state are illustrated. The user places fingers on the pair of finger hook portions 94 to bring the finger hook portions 94 close to each other. Accordingly, the portions each located between the finger hook portion 94 and the coupling member 93 in the longitudinal direction of the pair of arm portions 91 approach each other, and the portions each located between the coupling member 93 and the second engaging portion 88 in the longitudinal direction of the pair of arm portions 91 also approach each other.

At this time, the movement of the second engaging portion 88 within the second guide rail 74 in the transport direction Y is not substantially permitted, the second engaging portion 88 is substantially not displaced in the transport direction Y with respect to the supporting member 70.

On the other hand, movement of the second engaging portion 88 within the insertion hole 80*h* of the plate member 80 is permitted. Thus, the second engaging portion 88 moves to the downstream side Y2 in the transport direction Y within the insertion hole 80*h*, as the portions each located between the coupling member 93 and the second engaging portion 88 in the longitudinal direction of the pair of arm portions 91 approach each other. In other words, the plate member 80 moves relative to the second engaging portion 88 to the upstream side Y1 in the transport direction Y. The plate member 80 is also considered to move relative to the supporting member 70 to the upstream side Y1 in the transport direction Y.

Further, movement of the first engaging portion 81 within the first guide rail 73 is also permitted. Thus, the first engaging portion 81 moves in the first guide rail 73 to the upstream side Y1 in the transport direction Y, as the plate member 80 moves relative to the supporting member 70 to the upstream side Y1. The first protruding piece 81*b* is located outside the first recessed portion 73*d*, and the second protruding piece 81*c* is located within the second recessed portion 73*e*. The second protruding piece 81*c* is located within the second recessed portion 73*e*, thereby restricting the first engaging portion 81 from falling out of the first guide rail 73.

In addition, a shortest distance between the first base portion 81*a* of the first engaging portion 81 and the third protruding piece 88*b* of the second engaging portion 88 in the transport direction Y when the edge holders 78 and 79 are in the slide-enabled state is a second distance P2. The second distance P2 is greater than the inter-rail distance Q. Thus, a portion of the supporting member 70 located between the first guide rail 73 and the second guide rail 74 is not sandwiched in the transport direction Y by the first engaging portion 81 and the second engaging portion 88. Thus, the edge holders 78 and 79 can slide in the width direction X with respect to the supporting member 70.

The edge holders 78 and 79 may each have, instead of the operating portion 82, the second engaging portion 88 that protrudes from the first surface 80*a* of the plate member 80 and is engaged with the second guide rail 74.

The state of the edge holders 78 and 79 need not be changeable between the slide-regulated state and the slide-enabled state. In other words, the state of the edge holders 78 and 79 may be one of the slide-regulated state and the slide-enabled state.

The configuration for making the edge holders 78 and 79 in the slide-regulated state may be changed as appropriate. For example, the first engaging portion 81 and the second engaging portion 88 may be formed of an elastic member. In this case, with restoring force of the first engaging portion 81 and the second engaging portion 88 in a compressed state, the supporting member 70 is sandwiched by the first engaging portion 81 and the second engaging portion 88.

When the space on the upper side Z1 of the cap unit 51 is the first retraction region B1, the first gap S1 need not be provided.

As long as the first edge holder 78 can fall into the first gap S1, the dimension LS1 of the first gap S1 in the width direction X may be larger than the dimension H78 in a thickness direction of the first edge holder 78, and less than the dimension L78 of the first edge holder 78 in the width direction X.

The second gap S2 need not be provided.

An upper surface in the first retraction region B1 may be a flat surface, or a stepped surface that lowers in stages as the surface extends away from the first side surface 70*a* of the supporting member 70 to the first direction side X1. In this case, the first edge holder 78 disengaged from the guide rails 73 and 74 can be prevented from catching on the upper surface in the first retraction region B1.

For example, in a configuration in which there is a wall surface protruding upward at the upper surface in the first retraction region B1, there is a possibility that the first edge holder 78 disengaged from the guide rails 73 and 74 catches on the protruding wall surface in the first retraction region B1 and further movement thereof is regulated, or the first edge holder 78 rotates with a caught place as an origin, and inclines. In this case, there is a possibility that the first edge holder 78 whose movement is regulated is loaded, or the carriage 32 collides with a portion of an inclined first edge holder 78. Compared to this, in a configuration in which a wall surface causing a catch on the upper surface in the first retraction region B1 of the first edge holder 78 disengaged from the guide rails 73 and 74 is not present, the second edge holder 79 can be retracted appropriately without catching in the first retraction region B1.

Similarly, the upper surface in the second retraction region B2 may be a flat surface, or a stepped surface that lowers in stages as the surface extends away from the second side surface 70*b* of the supporting member 70 to the second direction side X2. In this case, the second edge holder 79 disengaged from the guide rails 73 and 74 can be prevented from catching on the upper surface in the second retraction region B2.

For example, in a configuration in which there is a wall surface protruding upward on the upper surface in the second retraction region B2, there is a possibility that the second edge holder 79 disengaged from the guide rails 73 and 74 catches on the protruding wall surface in the second retraction region B2, and further movement thereof is regulated, or the second edge holder 79 rotates with a caught place as an origin, and inclines. In this case, there is a possibility that the second edge holder 79 whose movement is regulated is loaded, or the carriage 32 collides with a portion of an inclined second edge holder 79. Compared to this, in a configuration in which a wall surface causing a catch on the upper surface in the second retraction region B2 of the second edge holder 79 disengaged from the guide rails 73 and 74 is not present, the second edge holder 79 can be retracted appropriately without catching in the second retraction region B2.

The dimension LS2 of the second gap S2 in the width direction X may be greater than the dimension L79 of the second edge holder 79 in the width direction X.

The number and a type of the maintenance devices constituting the maintenance unit 15 may be changed as appropriate.

The nozzle opening surface 37*a* of the liquid discharging head 37 may protrude to the lower side Z2 in the vertical direction Z of the lower surface 32*a* of the carriage 32.

Technical ideas that can be understood from the above-described exemplary embodiment and the modified example will be described below, together with effects thereof.

(A) A printing apparatus includes a carriage configured to support a liquid discharging head for discharging liquid onto a medium being transported, and to be caused to perform scanning along a width direction intersecting with a transport direction of the medium, a supporting member having a first guide rail extending along the width direction, and a support face capable of supporting the medium, and an edge holder having a first engaging portion engaged with the first guide rail, and a plate member covering a first end portion of the medium on a first direction side in the width direction, wherein on the first direction side of an end portion on the first direction side in the width direction of the first guide rail, a retraction region is provided in which the edge holder can be disposed in a state in which an engaging state between the first guide rail and the first engaging portion is released.

According to this configuration, when a medium jam occurs, and the carriage presses the edge holder to the first direction side via a jam portion of the medium, the engaging state between the first guide rail and the first engaging portion is released, and the edge holder moves to the retraction region. Thus, a load applied to the edge holder is reduced, compared to a case where the edge holder is fixed to the supporting member and cannot move in the width direction, and a case where a configuration is adopted in which the edge holder can move along the guide rail but further movement thereof is regulated by a rail end. Thus, damage to the edge holder can be suppressed.

(B) In the printing apparatus described above, the first guide rail may be continuous with a side surface on the first direction side of the supporting member, and the retraction region may be located on the first direction side of the side surface.

According to this configuration, the edge holder can be retracted from above the supporting member.

(C) In the printing apparatus described above, the supporting member may have a second guide rail extending along the width direction at a position different from that of the first guide rail in the transport direction, and the edge holder may have a second engaging portion that is engaged with the second guide rail.

According to this configuration, compared to a case where the edge holder is attached to the supporting member only by engaging between the first guide rail and the first engaging portion, inclination with respect to the transport direction when the edge holder moves to the retraction region can be suppressed.

(D) In the printing apparatus described above, the first guide rail and the second guide rail may each have a concave shape recessed from the support face, and the first engaging portion and the second engaging portion may each have a convex shape protruding from the plate member toward the supporting member, and the first engaging portion and the second engaging portion may each be capable of sandwiching a portion of the supporting member located between the first guide rail and the second guide rail.

When the portion of the supporting member located between the first guide rail and the second guide rail is not sandwiched in the transport direction by the first engaging portion and the second engaging portion, a difference between displacement of the first engaging portion with respect to the first guide rail and displacement of the second engaging portion with respect to the second guide rail is likely to be large, when the edge holder moves to the retraction region. Accordingly, the edge holder may incline with respect to the transport direction.

Compared to this, when the portion of the supporting member located between the first guide rail and the second guide rail is sandwiched in the transport direction by the first engaging portion and the second engaging portion, a difference between displacement of the first engaging portion with respect to the first guide rail and displacement of the second engaging portion with respect to the second guide rail becomes small, when the edge holder moves to the retraction region. Thus, inclination of the edge holder with respect to the transport direction can be further suppressed.

(E) In the printing apparatus described above, the first guide rail and the second guide rail may each have a concave shape recessed from the support face, and when, of a pair of inner side surfaces, facing each other in the transport direction, of the first guide rail, an inner side surface closer to the second guide rail is a first inner side surface, an inner side surface further from the second guide rail is a second inner side surface, and of a pair of inner side surfaces, facing each other in the transport direction, of the second guide rail, an inner side surface closer to the first guide rail is a third inner side surface, and an inner side surface further from the first guide rail is a fourth inner side surface, the first engaging portion may have a convex shape protruding from the plate member toward the supporting member, and may be capable of pressing the second inner side surface, and the second engaging portion may have a convex shape protruding from the plate member toward the supporting member, and may be capable of pressing the fourth inner side surface.

When the first engaging portion is separated from the first inner side surface and the second inner side surface, and the second engaging portion is separated from the third inner side surface and the fourth inner side surface, the difference between the displacement of the first engaging portion with respect to the first guide rail and the displacement of the second engaging portion with respect to the second guide rail is likely to be large when the edge holder moves to the retraction region. Accordingly, the edge holder may incline with respect to the transport direction.

Compared to this, when the first engaging portion presses the second inner side surface, and the second engaging portion presses the fourth inner side surface, the difference between the displacement of the first engaging portion with respect to the first guide rail and the displacement of the second engaging portion with respect to the second guide rail becomes smaller when the edge holder moves to the retraction region. Thus, inclination of the edge holder with respect to the transport direction can be further suppressed.

(F) The printing apparatus described above may include a maintenance device disposed on the first direction side of the supporting member in the width direction and used for maintenance of the liquid discharging head, and an upper surface of the maintenance device may be located on a lower side of a lower surface of the plate member in a state in which the first engaging portion is engaged with the first guide rail.

According to this configuration, a space on an upper side of the maintenance device becomes the retraction region. Thus, for example, compared to a case where a gap is provided between the supporting member and the maintenance device in the width direction, and the gap is used as a retraction region, an increase in size in the width direction of the printing apparatus can be suppressed.

(G) In the printing apparatus described above, the maintenance device may include a flushing box having a receiving opening that opens upward in a vertical direction intersecting with the width direction and the transport direction, and a dimension of the receiving opening in the transport direction may be shorter than a dimension of the edge holder in the transport direction.

According to this configuration, the edge holder moved to the retraction region is disposed so as to span the flushing box in the transport direction. Thus, it is possible to avoid the edge holder from falling into the receiving opening of the flushing box.

(H) The printing apparatus described above may include a housing that accommodates the carriage, the supporting member, and the edge holder, and the housing may include an opening at a position corresponding to the retraction region in the width direction.

According to this configuration, the edge holder moved to the retraction region can be retrieved from the opening.

What is claimed is:

1. A printing apparatus, comprising:

a carriage configured to support a liquid discharging head for discharging liquid onto a medium being transported, and to be caused to perform scanning along a width direction intersecting with a transport direction of the medium;

a maintenance device configured to be used for maintenance of the liquid discharging head;

a supporting member having a first guide rail extending along the width direction, and a support face configured to support the medium; and an edge holder having a first engaging portion engaged with the first guide rail, and a plate member covering a first end portion of the medium on a first direction side in the width direction, an area of the scanning of the liquid discharging head overlapping the edge holder in the transport direction, wherein the first guide rail is provided across an entirety of the supporting member in the width direction, when the first engaging portion engages the first guide rail and a position of the edge holder is adjusted such that the plate member covers the first end portion of the medium, the edge holder is biased to the first guide rail with a predetermined force and the edge holder is enabled to slide along the first guide rail if horizontal force which is larger than the predetermined force is applied to the edge holder, when the medium becomes jammed in a condition that the edge holder is biased to the first guide rail with the predetermined force, a jam portion of the medium is raised and stuck in the width direction between the carriage and the edge holder such that the carriage forces the jam portion into the edge holder in the width direction, a magnitude of force that the carriage presses the edge holder via the medium is magnitude large enough to slide the edge holder against the predetermined force, the edge holder Aides along the first guide rail in the width direction toward a retraction region, and when the edge holder is fully sled to the retraction region, the first engaging portion disengages the first guide rail and the edge holder falls in a gap between the supporting member and the maintenance device formed in the retraction region.

2. The printing apparatus according to claim 1, wherein the retraction region is located on the first direction side of a side surface.

3. The printing apparatus according to claim 1, wherein the supporting member has a second guide rail extending along the width direction at a position different from that of the first guide rail in the transport direction, and the edge holder has a second engaging portion engaged with the second guide rail.

4. The printing apparatus according to claim 3, wherein the first guide rail and the second guide rail each have a concave shape recessed from the support face, the first engaging portion and the second engaging portion have a convex shape protruding from the plate member toward the supporting member, and the first engaging portion and the second engaging portion are configured to sandwich a portion of the supporting member located between the first guide rail and the second guide rail.

5. The printing apparatus according to claim 3, wherein the first guide rail and the second guide rail each have a concave shape recessed from the support face, and when, of a pair of inner side surfaces, facing each other in the transport direction, of the first guide rail, an inner side surface closer to the second guide rail is a first inner side surface, and an inner side surface further from the second guide rail is a second inner side surface, and of a pair of inner side surfaces, facing each other in the transport direction, of the second guide rail, an inner side surface closer to the first guide rail is a third inner side surface, and an inner side surface further from the first guide rail is a fourth inner side surface, the first engaging portion has a convex shape protruding from the plate member toward the supporting member, and configured to press the second inner side surface, and the second engaging portion has a convex shape protruding from the plate member toward the supporting member, and configured to press the fourth inner side surface.

6. The printing apparatus according to claim 1, wherein the maintenance device disposed on the first direction side of the supporting member in the width direction, and an upper surface of the maintenance device is located on a lower side of a lower surface of the plate member in a state in which the first engaging portion is engaged with the first guide rail.

7. The printing apparatus according to claim 6, wherein the maintenance device includes a flushing box having a receiving opening that is configured to open upward in a vertical direction intersecting with the width direction and the transport direction, and a dimension of the receiving opening in the transport direction is shorter than a dimension of the edge holder in the transport direction.

8. The printing apparatus according to claim 1, comprising:

a housing configured to accommodate the carriage, the supporting member, and the edge holder.

9. The printing apparatus according to claim 1, wherein a dimension of the gap is larger than a dimension of the edge holder in the width direction.

10. The printing apparatus according to claim 1, wherein a depth of the gap in a vertical direction is greater than a dimension of the edge holder in the width direction.

* * * * *